United States Patent
Suzuki et al.

(10) Patent No.: US 7,442,344 B2
(45) Date of Patent: Oct. 28, 2008

(54) CERAMIC MEMBER WITH OXYGEN ION CONDUCTIVITY AND USE THEREOF

(75) Inventors: Takehiro Suzuki, Nagoya (JP); Atsushi Fukaya, Obu (JP); Hisatomi Taguchi, Nagoya (JP); Shigeo Nagaya, Nagoya (JP); Kiyoshi Komura, Nagoya (JP); Syozo Watanabe, Nagoya (JP)

(73) Assignees: Chubu Electric Power Co., Inc., Nagoya (JP); Noritake Co., Limited, Nagoya (JP)

( * ) Notice: Subject to any disclaimer, the term of this patent is extended or adjusted under 35 U.S.C. 154(b) by 649 days.

(21) Appl. No.: 10/494,293

(22) PCT Filed: Nov. 7, 2002

(86) PCT No.: PCT/JP02/11593
§ 371 (c)(1),
(2), (4) Date: May 18, 2004

(87) PCT Pub. No.: WO03/040058
PCT Pub. Date: May 15, 2003

(65) Prior Publication Data
US 2005/0006249 A1 Jan. 13, 2005

(30) Foreign Application Priority Data
Nov. 9, 2001 (JP) ............................. 2001-344218
May 23, 2002 (JP) ............................. 2002-149496

(51) Int. Cl.
| | |
|---|---|
| B01J 10/00 | (2006.01) |
| B01J 10/02 | (2006.01) |
| B01J 12/00 | (2006.01) |
| B01J 12/02 | (2006.01) |
| B01J 14/00 | (2006.01) |
| B01J 15/00 | (2006.01) |
| B01J 16/00 | (2006.01) |
| B01D 53/02 | (2006.01) |
| B01D 59/26 | (2006.01) |
| B01D 53/22 | (2006.01) |
| B01D 59/12 | (2006.01) |
| C04B 35/00 | (2006.01) |
| C04B 35/50 | (2006.01) |
| C04B 35/51 | (2006.01) |

(52) U.S. Cl. .................... 422/129; 95/54; 96/4; 96/11; 501/135; 501/152

(58) Field of Classification Search ................. 422/129; 95/54; 96/4, 11; 501/135, 152
See application file for complete search history.

(56) References Cited

U.S. PATENT DOCUMENTS
5,240,480 A    8/1993   Thorogood et al. ............... 96/4
(Continued)

FOREIGN PATENT DOCUMENTS
EP    0 399 833 A1    11/1990
(Continued)

OTHER PUBLICATIONS

Stevenson et al., "Mixed Oxygen Ion/Electron-Conducting Ceramics for Oxygen Separation," Proceedings of the tenth annual conference on fossil energy materials, pp. 117-126, 1996.
(Continued)

Primary Examiner—Alexa D Neckel
Assistant Examiner—Matthew J Merkling
(74) Attorney, Agent, or Firm—Oliff & Berridge, PLC

(57) ABSTRACT

It is an object of the present invention to provide a ceramic member with excellent balance between oxygen ion conductivity and endurance (resistance to cracking and the like), an oxygen ion permeation module and a chemical reactor such as an oxygen separator, using such a ceramic member. The ceramic member with oxygen ion conductivity in accordance with the present invention has a perovskite-type crystal structure and a composition represented by the general formula:

$$(Ln_{1-x}M_x)(Ti_{1-y}Fe_y)O_3$$

(where Ln represents at least one element selected from lanthanoids, and M represents at least one element selected from the group containing Sr, Ca, and Ba, $0<x<1$, $0.4 \leq y<1$, $x+y \geq 1$). The oxygen ion permeation module composed by employing such a ceramic member can be used as a structural component of an oxygen separator, an oxidation reactor (for example, a reactor for partial oxidation of hydrocarbons), and the like.

21 Claims, 6 Drawing Sheets

U.S. PATENT DOCUMENTS

| | | | | |
|---|---|---|---|---|
| 5,261,932 | A | 11/1993 | Carolan et al. | 95/54 |
| 5,306,411 | A | 4/1994 | Mazanec et al. | 204/265 |
| 5,356,728 | A | 10/1994 | Balachandran et al. | 429/8 |
| 5,681,373 | A | 10/1997 | Taylor et al. | 96/11 |
| 5,712,220 | A | 1/1998 | Carolan et al. | 502/324 |
| 5,817,597 | A | 10/1998 | Carolan et al. | 502/400 |
| 5,868,918 | A | 2/1999 | Adler et al. | 205/615 |
| 6,042,703 | A | 3/2000 | Adler et al. | 204/252 |
| 6,056,807 | A | 5/2000 | Carolan et al. | 96/4 |
| 6,090,265 | A | 7/2000 | Adler et al. | 205/615 |
| 6,090,500 | A | 7/2000 | Ishihara et al. | 429/33 |
| 6,117,288 | A | 9/2000 | Adler et al. | 204/256 |
| 6,346,497 | B1 | 2/2002 | Nakamura et al. | 501/138 |
| 6,403,041 | B1 * | 6/2002 | Takahashi et al. | 422/240 |
| 6,586,127 | B1 | 7/2003 | Ishihara et al. | 429/33 |

FOREIGN PATENT DOCUMENTS

| | | |
|---|---|---|
| EP | 0 438 902 A2 | 7/1991 |
| EP | 1 095 914 A2 | 5/2001 |
| JP | A 56-92103 | 7/1981 |
| JP | 61-021717 | 1/1986 |
| JP | A 4-160048 | 6/1992 |
| JP | A 4-366523 | 12/1992 |
| JP | A 5-74352 | 3/1993 |
| JP | A 6-56428 | 3/1994 |
| JP | A 6-198149 | 7/1994 |
| JP | A 6-219861 | 8/1994 |
| JP | A 8-22722 | 1/1996 |
| JP | A 8-276112 | 10/1996 |
| JP | A 9-235121 | 9/1997 |
| JP | A 9-299749 | 11/1997 |
| JP | A 10-114520 | 5/1998 |
| JP | A 10-180031 | 7/1998 |
| JP | A 11-253769 | 9/1999 |
| JP | A 11-335164 | 12/1999 |
| JP | A 11-335165 | 12/1999 |
| JP | A 11-350972 | 12/1999 |
| JP | A 2000-103668 | 4/2000 |
| JP | A 2000-154060 | 6/2000 |
| JP | A 2001-093325 | 4/2001 |
| JP | A 2001-106532 | 4/2001 |
| JP | A 2001-518014 | 10/2001 |
| JP | A 2002-12472 | 1/2002 |
| JP | A 2002-97083 | 4/2002 |
| WO | WO 9741060 A1 * | 11/1997 |
| WO | WO 99/21640 | 5/1999 |
| WO | WO 01/23078 A1 * | 4/2001 |

OTHER PUBLICATIONS

Fagg et al., "The stability and mixed conductivity in La and Fe dopede $SrTiO_3$ in the search for potential SOFC anode materials," Journal of the European ceramic society, vol. 21, pp. 1831-1835, 2001.

* cited by examiner

CERAMIC MEMBER WITH OXYGEN ION CONDUCTIVITY AND USE THEREOF

FIELD OF TECHNOLOGY

The present invention relates to a ceramic member with oxygen ion conductivity for causing selective permeation of oxygen ions. Further, the present invention also relates to an oxygen ion permeation module employing the ceramic member. Moreover, the present invention also relates to a chemical reactor such as an oxygen separator or an oxidation reactor (for example, a reactor for partial oxidation of hydrocarbons), which is comprised of said oxygen ion permeation module.

BACKGROUND TECHNOLOGY

Ceramics (oxygen ion conductors) having the property of causing selective permeation of oxygen ions at a high temperature (for example, 500° C. or higher) are known. Ceramic members formed from such oxygen ion conductors can be used with the object of separating oxygen from an oxygen-containing gas mixture. For example, an oxygen separation method using zirconium oxide as an oxygen ion conductor is known. In a representative modification of such a separation method, as shown in FIG. 11, external electrodes (not shown in the Figure) are pasted on both surfaces of a membranous ceramic member (oxygen permeable membrane) composed of zirconium oxide, and those electrodes are short circuited with an external circuit 116. This ceramic member 110 is disposed so that the partial pressure of oxygen at one surface side 110b of the membranous ceramic member 110 is lower than the partial pressure of oxygen on the other surface side 110a thereof. With such a configuration, on one surface 110a of the ceramic member 110, oxygen molecules accept electrons and become oxygen ions, and those oxygen ions diffuse (are conducted) in zirconium oxide and reach the other surface 110b where they discharge the electrons and become oxygen molecules. The discharged electrons are returned to the other surface 110a via the external circuit 116. As a result, oxygen is continuously separated from the gas, which is in contact with one surface 110a of the ceramic member 110. Technology of this type was disclosed in Japanese Patent No. 3,173,724 (Japanese Patent Application Laid-open No.H10-180031) and Japanese Patent Application Laid-open No.H9-299749.

On the other hand, some oxygen ion conductors demonstrate electron conductivity (the meaning of this term also includes hole conductivity), together with oxygen ion conductivity. Such oxygen ion conductors are also sometimes called electron—oxygen ion mixed conductors (hereafter referred to as "mixed conductors"). In the membranous ceramic members composed of such mixed conductors, as shown in FIG. 12, the ceramic member 120 itself has electron conductivity, and it is possible to cause a continuous permeation of oxygen ions from one surface 120a to the other surface 120b, without using external electrodes or an external circuit for short-circuiting the two surfaces. Technology of this type was openly disclosed in Japanese Patent Applications Laid-open Nos. 2001-106532, 2001-93325, 2000-154060, H 11-335164, H1 1-335165, H10-114520, and S56-92103, Japanese Patent No. 2,533,832 (Japanese Patent Application Laid-open No. H6-198149), Japanese Patent No. 2,813,596 (Japanese Patent Application Laid-open No. H6-219861), Japanese Patent No. 2,966,340 (Japanese Patent Application Laid-open No. H8-276112), Japanese Patent No. 2,966,341 (Japanese Patent Application Laid-open No. H9-235121), Japanese Patent No. 2,993639 (Japanese Patent Application Laid-open No. H11-253769), U.S. Pat. Nos. 5,306,411 and 5,356,728, Japanese Patent Application Laid-open Nos. 2001-269555, 2002-12472, and 2002-97083.

Examples of representative oxygen ion conductors include perovskite-type mixed conductors of the $LaSrCoO_3$ type. Such conductors have a crystal structure in which part of La in a perovskite-type structure based on $LaCoO_3$ is substituted with Sr. Furthermore, perovskite-type mixed conductors of the $LaSrCoFeO_3$ type with a crystal structure, in which part of Co is replaced with a transition metal element such as Fe, have also been suggested. In conductors of such composition, the oxygen ion conductivity tends to increase, as the rate of substitution of La with Sr increases. However, in compositions with a high Sr substitution rate, when a membranous ceramic member composed of such a conductor is formed (fired), cracks easily appear in the ceramic member during use thereof (for example, when used as an oxygen permeable membrane). In particular, when such a conductor is exposed to a reducing atmosphere, the conductor is reduced. As a result, the crystal structure of the conductor changes and cracks can easily originate therein. The cracked ceramic member can no longer demonstrate its inherent performance (oxygen separation ability and the like). Thus, the ceramic member composed of a conductor with such a composition has poor endurance.

Examples of other representative oxygen ion conductors include mixed conductors having a perovskite-type structure of the $LnGaO_3$ type (Ln is a lanthanoid). For example, a mixed conductor was suggested that had a crystal structure in which part of Ln in a perovskite-type structure based on $LnGaO_3$ was substituted with an alkaline earth metal element such as Sr, and part of Ga was substituted with Fe. Such mixed conductors of the $LnGaO_3$ type have high resistance to reduction (they are not easily reduced even when exposed to a reducing atmosphere, thereby maintaining their crystal structure). However, ceramic members formed from mixed conductors of the $LnGaO_3$ type are relatively expensive due to the high cost of starting materials. Accordingly, there is a demand for ceramic members that have good endurance (resistance to reduction) and can be formed from an oxygen ion conductor that can be manufactured at a low cost.

On the other hand, the ceramic members formed from the aforesaid oxygen ion conductors can also be used in reactors for oxidation, for example for partial oxidation of hydrocarbons. For example, the ceramic member is formed into a membrane (this term includes also thin layers), one surface thereof is brought into contact with a gas containing oxygen, and the other surface is brought into contact with a gas containing a hydrocarbon (methane or the like). As a result, the hydrocarbon that is brought into contact with one surface of the ceramic member can be oxidized with oxygen ions that are supplied through the ceramic member from the other surface of the membranous ceramic member. In order to increase the efficiency of this oxidation reaction, a catalyst (Ni or the like) for enhancing the oxidation reaction can be applied to the first surface of the ceramic member. However, when a ceramic member formed from the conventional oxygen ion conductor (for example, of the $LaSrCoO_3$ type, the $LnGaO_3$ type, or the like) is used for partial oxidation of the hydrocarbons, some of the supplied hydrocarbons decompose on the first side of the ceramic member, and the catalyst easily degrades due to catalyst poisoning by the carbon that precipitates as a result of such decomposition.

DISCLOSURE OF THE INVENTION

It is an object of the present invention to provide a ceramic member with an excellent balance of oxygen ion conductivity and endurance (for example, resistance to cracking). It is another object of the present invention to provide a ceramic member that inhibits carbon precipitation when hydrocarbons or other compounds containing carbon atoms are oxidized using the ceramic member. It is yet another object of the present invention to provide an oxygen ion permeation module using such a ceramic member. It is still another object of the present invention to provide an oxygen separation method using such a ceramic member and an oxygen separator employed in such a method. Furthermore, still another object of the present invention is to provide a method for oxidizing gases of a variety of types, which are the objects of oxidation, using such a ceramic member and an oxygen reactor to be used in such a method (for example, a method for partial oxidation of hydrocarbons and a reactor for partial oxidation of hydrocarbons used in such a method).

The inventors have found that the above-described problems can be resolved with a ceramic member that is formed from a ceramic having a crystal structure in which part of Ln in a perovskite-type structure based on $LnBO_3$ (Ln=lanthanoid) is replaced with a specific alkaline earth metal, and its B sites are occupied with Ti or Fe.

One of the ceramic members provided by the present invention is formed from a ceramic having a perovskite-type crystal structure and a composition represented by the general formula:

$$(Ln_{1-x}M_x)(Ti_{1-y}Fe_y)O_3 \qquad (A)$$

In the general formula (A), Ln represents at least one element (preferably La) selected from lanthanoids. M represents at least one element selected from the group containing Sr, Ca, and Ba. Furthermore, x is typically within a range of $0<x<1$, and y is within a range of $0.4 \leq y < 1$. Further, $x+y \geq 1$. Such a ceramic member is suitable for applications in which selective permeation of oxygen ions is induced.

Here, in the aforesaid general formula (A), the number of oxygen atoms is shown to be 3, but actually the number of oxygen atoms is 3 or less (typically less than 3). However, accurate representation is difficult because the number of oxygen atoms varies depending on the type of atoms (here, M and Fe) used for partial substitution of the perovskite structure, the degree of substitution, and other conditions. Accordingly, in the present specification, in the general formula representing the perovskite-type materials, the number of oxygen atoms is shown to be 3 for the sake of convenience. However, this representation should not be construed as limiting the technological scope of the invention disclosed herein. Therefore, the number of oxygen atoms can also be written as 3-z (for example, the aforesaid general formula (A) can be represented as $(Ln_{1-x}M_x)(Ti_{1-y}Fe_y)O_{3-z}$). Here z is typically a positive number ($0<z<1$) that does not exceed 1.

Such a ceramic member is formed from a ceramic with a structure, in which the B sites in the perovskite-type crystal structure, represented by $LnBO_3$, are occupied by Ti and Fe. The specific combination of Ti with Fe increases resistance to reduction (resistance to the occurrence of cracking when the material is exposed to a reducing atmosphere). Furthermore, when the ceramic member is used for oxidation of hydrocarbons or other carbon-containing compounds, precipitation of carbon on the ceramic member surface is suppressed. Therefore, when an oxidation-enhancing catalyst (Ni-based catalyst and the like) is applied to the surface of the ceramic member, degradation of the catalyst is diminished. Moreover, the inventors were the first to discover that the effect of preventing the occurrence of cracking and/or suppressing the precipitation of carbon can be obtained by occupying the B sites in the aforesaid crystal structure with a specific combination of elements, that is, with Ti and Fe.

In the preferred embodiment of the ceramic member in accordance with the present invention, this ceramic member is formed from a ceramic (sintered body) having a perovskite-type crystal structure and a composition that can be represented by the general formula:

$$(Ln_{1-x}Sr_x)(Ti_{1-y}Fe_y)O_3 \qquad (1)$$

In the general formula (1), Ln represents at least one element (preferably La) selected from lanthanoids. Furthermore, x is typically within a range of $0.3 \leq x \leq 0.5$, and y is within a range of $0.85 \leq y < 1$.

In another preferred embodiment of the ceramic member in accordance with the present invention, this ceramic member is formed from a ceramic having a perovskite-type crystal structure and a composition that can be represented by the general formula:

$$(Ln_{1-x}Ba_x)(ti_{1-y}Fe_y)O_3 \qquad (2)$$

In the general formula (2), Ln represents at least one element (preferably La) selected from lanthanoids. Furthermore, x is typically within a range of $0.4 \leq x \leq 0.6$, and y is within a range of $0.85 \leq y < 1$.

In yet another preferred embodiment of the ceramic member in accordance with the present invention, this ceramic member is formed from a ceramic having a perovskite-type crystal structure and a composition that can be represented by the general formula:

$$(Ln_{1-x}Ca_x)(Ti_{1-y}Fe_y)O_3 \qquad (3)$$

In the general formula (3), Ln represents at least one element (preferably La) selected from lanthanoids. Furthermore, x is typically within a range of $0.25 \leq x \leq 0.45$, and y is within a range of $0.85 \leq y < 1$.

The ceramic member formed from a ceramic having a composition represented by any of the aforesaid general formulas (1) to (3) can demonstrate especially excellent oxygen ion conductivity.

In yet another preferred embodiment of the ceramic member in accordance with the present invention, this ceramic member is formed from a ceramic having a perovskite-type crystal structure and a composition that can be represented by the general formula:

$$(Ln_{1-x}Sr_x)(Ti_{1-y}Fe_y)O_3 \qquad (4)$$

In the general formula (4), Ln represents at least one element (preferably La) selected from lanthanoids. Furthermore, x is typically within a range of $0.2 \leq x \leq 0.6$, and y is within a range of $0.5 \leq y < 1$. Further, x+y is within a range of $1 \leq x+y < 1.2$.

In yet another preferred embodiment of the ceramic member in accordance with the present invention, this ceramic member is formed from a ceramic having a perovskite-type crystal structure and a composition that can be represented by the general formula:

$$(Ln_{1-x}Ba_x)(Ti_{1-y}Fe_y)O_3 \qquad (5)$$

In the general formula (5), Ln represents at least one element (preferably La) selected from lanthanoids. Furthermore, x is typically within a range of $0.3 \leq x \leq 0.7$, and y is within a range of $0.5 \leq y < 1$. Further, x+y is within a range of $1 \leq x+y < 1.2$.

In yet another preferred embodiment of the ceramic member in accordance with the present invention, this ceramic member is formed from a ceramic having a perovskite-type crystal structure and a composition that can be represented by the general formula:

$$(Ln_{1-x}Ca_x)(Ti_{1-y}Fe_y)O_3 \qquad (6)$$

In the general formula (6), Ln represents at least one element (preferably La) selected from lanthanoids. Furthermore, x is typically within a range of $0.2 \leq x \leq 0.55$, and y is within a range of $0.5 \leq y < 1$. Further, x+y is within a range of $1 \leq x+y < 1.2$.

The ceramic member formed from a ceramic having a composition represented by any of the aforesaid general formulas (4) to (6) can demonstrate especially excellent endurance (for example, a high resistance to cracking when exposed to a reducing atmosphere).

Any of the ceramic members provided in accordance with the present invention can be formed into a membrane (this term includes thin sheets, tubes, and other layered products). Such a membranous ceramic member can be composed by applying a catalyst for enhancing the permeation of oxygen ions to at least one surface of the membrane. Catalysts comprising $(La_xSr_{1-x})(M'O_3$ (where $0.1 \leq x < 1$, and M' is at least one selected from Co, Cu, Fe, and Mn) are preferably used as the catalyst for enhancing the permeation of oxygen ions. Ceramic members of such configuration are suitable as structural components of the below-described oxygen separators and oxidation reactors for oxidizing a variety of gases, which are the objects of oxidation (for example, reactors for partial oxidation of hydrocarbons).

The present invention provides a laminated oxygen ion conductive part (also called a laminated ceramic part) of a configuration in which a membranous ceramic member is provided on the surface of a porous support body (porous support layer). The membranous ceramic member has a perovskite-type crystal structure and a composition that can be represented by the general formula $(Ln_{1-x}M_x)(Ti_{1-y}Fe_y)O_3$. Here, Ln represents at least one element (typically La) selected from lanthanoids. M represents at least one element selected from the group containing Sr, Ca, and Ba. Furthermore, typically $0 < x < 1$, $0.4 \leq y < 1$, and $x+y \geq 1$. In a typical example of the laminated oxygen ion conductive part in accordance with the present invention, the aforesaid membranous ceramic member has a composition represented by the aforesaid general formula (A). In the preferred embodiment of the present invention, the aforesaid membranous ceramic member has a composition represented by any of the aforesaid general formulas (1)-(3). In another preferred embodiment of the present invention, the aforesaid membranous ceramic member has a composition represented by any of the aforesaid general formulas (4)-(6).

For the porous support body constituting such a laminated oxygen ion conductive part, a material is preferably used that possesses stable heat resistance in the temperature range in which such laminated oxygen ion conductive parts are used (usually, 300° C. or higher, typically 500° C. or higher). For example, ceramic porous bodies having a composition similar to that of any of the above-described ceramic members, or ceramic bodies based on magnesia or zirconia can be used. Furthermore, metallic porous bodies based on a metal material and organic porous bodies based on resin materials with high heat resistance (for example, polyamides, polyamidoimides, and polybenzimidazole) may also be used.

In one preferred embodiment of the laminated oxygen ion conductive part in accordance with the present invention, a membranous ceramic member is formed on part of the surface of such a porous support body. No specific limitation is placed on the shape of the porous support body and it can be in the form of a membrane (layer) shaped as a sheet or a tube. In such membranous porous support bodies, the membranous ceramic member is preferably formed on one or both surfaces of the membrane. With such a configuration, one surface of the membranous ceramic member is mechanically supported, by the porous support body. Therefore, the endurance of the ceramic member can be further increased. As a result, the endurance of the laminated oxygen ion conductive part can be further increased.

The laminated oxygen ion conductive part can have a configuration in which a catalyst for enhancing the permeation of oxygen ions is applied to the surface of the aforesaid ceramic member and/or to the aforesaid porous support body. Catalysts comprising $(La_xSr_{1-x})M'O_3$ (where $0.1 \leq x < 1$, and M' is at least one selected from Co, Cu, Fe, and Mn) are preferably used as the catalyst for enhancing the permeation of oxygen ions.

When the ceramic member in accordance with the present invention is formed into a membrane, the preferred thickness of the membranous ceramic member is 10 μm to 5 mm, preferably 20 μm to 3 mm, and more preferably 50 μm to 2 mm. Furthermore, the same thickness is preferred for the membranous ceramic member formed on the surface of the porous support body in the laminated oxygen ion conductive part in accordance with the present invention. The performance characteristics, such as oxygen ion permeability and endurance, of a ceramic member having a membrane thickness within this range can be balanced at a high level.

An oxygen ion permeation module provided in accordance with the present invention comprises:
a casing,
a ceramic member accommodated in the casing,
an oxygen source supply chamber for supplying an oxygen-containing gas from the outside, this chamber being provided inside the casing so as to face the ceramic member, and
an oxidation reaction chamber that is provided inside the casing so as to face the ceramic member, that is hermetically separated from the oxygen source supply chamber via the ceramic member, and that induces an oxidation reaction with the participation of the oxygen ions that are supplied by permeation through the ceramic member from said oxygen source supply chamber.

The ceramic member used in the module has a perovskite-type crystal structure and a composition that can be represented by the general formula:

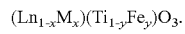

$(Ln_{1-x}M_x)(Ti_{1-y}Fe_y)O_3$.

Here, Ln represents at least one element (typically La) selected from lanthanoids. M represents at least one element selected from the group containing Sr, Ca, and Ba. Furthermore, typically $0 < x < 1$, $0.4 \leq y < 1$, and $x+y \geq 1$.

In a typical example of the oxygen ion permeation module in accordance with the present invention, the aforesaid ceramic member has a composition represented by the aforesaid general formula (A). In the preferred embodiment of the present invention, the ceramic member has a composition represented by any of the aforesaid general formulas (1)-(3). In another preferred embodiment of the present invention, the aforesaid ceramic member has a composition represented by any of the aforesaid general formulas (4)-(6).

Still another preferred embodiment of the oxygen ion permeation module in accordance with the present invention is a membrane-type oxygen ion permeation module in which the aforesaid ceramic member is formed as a membrane, and a catalyst for enhancing the permeation of oxygen ions is applied to at least the surface of the membranous ceramic member that is on the side of the oxygen source supply chamber.

Yet another preferred embodiment of the oxygen ion permeation module in accordance with the present invention is a membrane-type oxygen ion permeation module in which the aforesaid ceramic member is formed as a membrane, and a catalyst for enhancing the oxidation reaction is applied to at least the surface of the membranous ceramic member that is on the side of the oxidation reaction chamber.

Still another preferred example of the oxygen ion permeation module in accordance with the present invention is a membrane-type oxygen ion permeation module in which the aforesaid ceramic member is formed as a membrane, a catalyst for enhancing the permeation of oxygen ions is applied to at least the surface of the membranous ceramic member that is on the side of the oxygen source supply chamber, and a catalyst for enhancing the oxidation reaction is applied to at least the surface of the membranous ceramic member that is on the side of the oxidation reaction chamber.

Another oxygen ion permeation module provided in accordance with the present invention comprises:
 a casing,
 a laminated oxygen ion conductive part accommodated in the casing,
 an oxygen source supply chamber for supplying an oxygen-containing gas from the outside, this chamber being provided inside the casing opposite the laminated oxygen ion conductive part, and
 an oxidation reaction chamber that is provided inside the casing opposite the laminated oxygen ion conductive part, that is hermetically separated from the oxygen source supply chamber via the laminated oxygen ion conductive part, and that induces an oxidation reaction with the participation of the oxygen ions that are supplied by permeation through the ceramic member from said oxygen source supply chamber. Any of the above-described laminated oxygen ion conductive parts in accordance with the present invention can be used as the laminated oxygen ion conductive part constituting the module.

Such an oxygen ion permeation module can have a configuration in which a catalyst for enhancing the permeation of oxygen ions is applied to the surface of the aforesaid ceramic member on the side of the oxygen source supply chamber and/or to the aforesaid porous support body positioned on the oxygen source supply chamber side of the aforesaid ceramic member. Furthermore, a configuration is possible in which a catalyst for enhancing the oxidation reaction is applied to the surface of the aforesaid ceramic member on the side of the oxidation reaction chamber and/or to the aforesaid porous support body positioned on the oxidation reaction chamber side of the aforesaid ceramic member. The oxygen ion permeation module may also contain both the catalyst for enhancing the permeation of oxygen ions and the catalyst for enhancing the oxidation.

No specific limitation is placed on the type of the catalyst for enhancing the permeation of oxygen ions, which is used in any of the oxygen ion permeation modules in accordance with the present invention. Those catalysts for enhancing the permeation of oxygen ions that contain $(La_xSr_{1-x})M'O_3$, for example, (where $0.1 \leq x < 1$, and M' is at least one selected from Co, Cu, Fe, and Mn) are preferably used. A catalyst for enhancing the permeation of oxygen ions, in which M' is Co is especially preferred. It is also preferred that an Ni-based catalyst be included as the catalyst for enhancing the oxidation that is used in any of the oxygen ion permeation modules in accordance with the present invention.

The present invention provides an oxygen separator equipped with such an oxygen ion permeation module, an oxidation reactor (typically a reactor for partial oxidation of hydrocarbons) for oxidizing the various types of gases that are the objects of oxidation, and a chemical reactor used for various types of chemical reactions, which are accompanied by oxidation reaction.

Thus, the oxygen separator, provided by the present invention, comprises any of the above-described oxygen ion permeation modules;
 an oxygen source supply means for causing a gas containing oxygen to flow through to the oxygen source supply chamber of the module, and bringing the gas into contact with the surface of the ceramic member on the side of the oxygen source supply chamber; and
 an oxidation reaction chamber gas-circulation means for causing a gas with a partial pressure of oxygen lower than that on the oxygen source supply chamber side to flow through to the oxidation reaction chamber of the module, and bringing the gas into contact with the surface of the ceramic member on the side of the oxidation reaction chamber and a module thereof.

The ceramic member, provided in such an oxygen separator, can demonstrate both the oxygen ion conductivity and the electron conductivity. Therefore, such an oxygen separator can have a configuration in which no external electrodes are used for short-circuiting the surfaces of the ceramic member on the side of the oxygen source supply chamber and the side of the oxidation reaction chamber. A configuration using the external electrode may also be used.

Such an oxygen separator is advantageously suitable as an apparatus for the implementation of an oxygen separation method comprising the steps of:
 causing a gas containing oxygen to flow through to the oxygen source supply chamber of the oxygen permeation module in accordance with the present invention, and bringing the gas into contact with the surface of the aforesaid ceramic member on the side of the oxygen source supply chamber; and
 causing a gas with a partial pressure of oxygen lower than that on the oxygen source supply chamber side to flow through to the oxidation reaction chamber of the module, and bringing the gas into contact with the surface of the ceramic member on the side of the oxidation reaction chamber.

Further, the oxidation reactor (for example, a reactor for partial oxidation of hydrocarbons) provided by the present invention comprises any of the above-described oxygen ion permeation modules;
 an oxygen source supply means for causing a gas containing oxygen to flow through to the oxygen source supply chamber of the module, and bringing the gas into contact with the surface of the aforesaid ceramic member on the side of the oxygen source supply chamber; and
 an oxidation-target gas supply means for supplying a gas, containing the oxidation-target gas and having a partial pressure of oxygen lower than that on the oxygen source supply chamber side, to the oxidation reaction chamber of the module and bringing the gas into contact with the surface of the ceramic member on the side of the oxidation reaction chamber.

The ceramic member, provided in such an oxidation reactor, can demonstrate both oxygen ion conductivity and electron conductivity. Therefore, such a reactor can have a configuration in which no external electrodes are used for short-circuiting the surfaces of the aforesaid ceramic member on the side of the oxygen source supply chamber and the side of the oxidation reaction chamber. A configuration using an external electrode may also be used.

Such an oxidation reactor is preferably used as a reactor for the partial oxidation of hydrocarbons in which a hydrocarbon is supplied as the aforesaid oxidation-target gas. Such a reactor for the partial oxidation of hydrocarbons is preferably used under conditions such that the supply flow rate of the oxygen that is supplied by the aforesaid oxygen source supply means is higher by a factor of two or more than the flow rate of the hydrocarbon supplied by the oxidation reaction chamber gas-circulation means. As a result, the hydrocarbon oxidation efficiency can be increased.

Such an oxidation reactor is advantageously suitable as an apparatus for the implementation of an oxidation method (for example, a method for the partial oxidation of hydrocarbons) comprising the steps of:

supplying a gas containing oxygen to the oxygen source supply chamber of the oxygen permeation module in accordance with the present invention, and bringing the gas into contact with the surface of the aforesaid ceramic member on the side of the oxygen source supply chamber; and supplying a gas, containing the oxidation-target gas (for example, a hydrocarbon) and having a partial pressure of oxygen lower than that on the oxygen source supply chamber side, to the oxidation reaction chamber of the module and bringing the gas into contact with the surface of the ceramic member on the side of the oxidation reaction chamber.

BEST MODE FOR CARRYING OUT THE INVENTION

Figure 1:
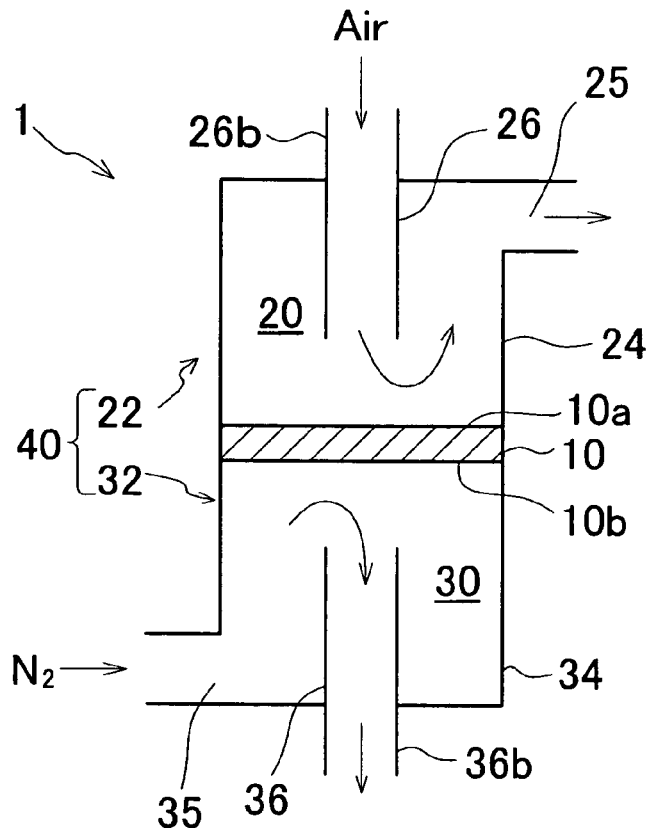
FIG. 1 is a schematic cross-sectional view illustrating a configuration example of the oxygen ion permeation module in accordance with the present invention.

The preferred embodiments of the present invention will be described below.

First the ceramic member in accordance with the present invention will be explained. The ceramic member in accordance with the present invention is formed from a ceramic having a composition represented by the general formula:

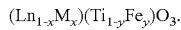

$(Ln_{1-x}M_x)(Ti_{1-y}Fe_y)O_3$.

Here, Ln represents at least one element selected from lanthanoids (typically La, Ce, Pr, Nd, and Sm), preferably La. Further, M represents at least one element selected from the group containing Sr, Ca, and Ba, of the alkali earth metal elements.

In the aforesaid general formula, "x" is a value representing the ratio at which the Ln in the perovskite-type structure is substituted with M. The x value can be within a range of $0<x<1$ (preferably $0.05 \leq x \leq 0.95$). A large x value is preferred from the standpoint of increasing oxygen ion conductivity. On the other hand, if the x value becomes too large, cracks can sometimes easily appear in the ceramic member.

The preferred range of the x value in accordance with the present invention differs depending on the type of M. Thus, when M is Sr, the preferred range is $0.2 \leq x \leq 0.6$, and the more preferred range is $0.3 \leq x \leq 0.5$. When M is Ba, the preferred range is $0.3 \leq x \leq 0.7$, and the more preferred range is $0.4 \leq x \leq 0.6$. When M is Ca, the preferred range is $0.2 \leq x \leq 0.55$, and the more preferred range is $0.25 \leq x \leq 0.45$.

In the aforesaid general formula, "y" is a value representing the ratio at which the Ti in the perovskite-type structure is substituted with Fe. The y value can be, for example, within a range of $0.4 \leq x < 1$. The preferred range of the y value is $0.5 \leq x < 1$, and the more preferred range is $0.85 \leq x < 1$. If the y value is too small (if the Ti ratio is too high), the oxygen ion conductivity tends to decrease. The use of a ceramic member in which the y value is within the aforesaid range, can prevent the occurrence of cracking and/or suppress the precipitation of carbon, while maintaining an oxygen ion conductivity suitable for practical use. Furthermore, it is preferred that in the ceramic member in accordance with the present invention, x and y satisfy the condition $x+y \geq 1$. It is preferred that x and y satisfy the condition $1 \leq x+y < 1.6$, and it is more preferred that they satisfy the condition $1 \leq x+y < 1.2$. It is especially preferred that x and y satisfy the condition $1 \leq x+y < 1.15$.

The ceramic member in accordance with the present invention is formed from a ceramic demonstrating at least oxygen ion conductivity. Typically, the ceramic member is formed from a ceramic demonstrating oxygen ion conductivity and electron conductivity. When the ceramic member is formed from a ceramic demonstrating mainly oxygen ion conductivity, a ceramic member with excellent oxygen ion conductivity can be obtained.

Further, when the ceramic member is formed to have a membranous shape from a ceramic demonstrating electron conductivity in addition to oxygen ion conductivity (mixed conductor), oxygen ions can be caused to permeate continuously from one surface of the ceramic member to another, without using an electrode or an external circuit for short-circuiting the two surfaces of the membranous ceramic member. The ceramic member thus used preferably has a level of electron conductivity such that the electric conductivity, $\sigma$, at a temperature of 800° C. is $\log \sigma = -1.2$ S/cm$^2$ or more (preferably $\log \sigma = -0.4$ S/cm$^2$ or more). Such a level of electron conductivity can be achieved, for example, in a ceramic member that satisfies the conditions $0 < x \leqq 0.65$ and $0.85 < y < 1$ in the aforesaid formulas. Furthermore, such a level of electron conductivity is realized especially easily when y is within a range of $0.5 \leqq y < 1$ (more preferably $0.85 \leqq y < 1$) and x is within the aforesaid preferred range corresponding to the type of M (Sr, Ba, or Ca).

No specific limitation is placed on the shape of the ceramic member. In the preferred embodiment of the present invention, the ceramic member is formed to have a membranous shape. Here, the term "membranous" is a general term including flat, curved, tubular (open-end tubular shape in which both ends are open, and a closed-end tubular shape in which one end is open), and honeycomb-like shapes. Oxygen ions can be effectively caused to permeate from one surface of the membrane to the other surface by creating different partial pressures of oxygen on both sides of the membrane. It is preferred that the membrane be dense (for example, the relative density is 95% or more of the theoretic density) and substantially gas-impermeable. The thickness of the ceramic member can be, for example, 0.5 μm to 10 mm, preferably 1 μm to 5 mm, more preferably 2 μm to 3 mm, and still more preferably 5 μm to 2 mm. The ceramic member of the composition represented by any of the general formulas (4) to (6) is preferably a membranous ceramic member with a thickness of 1 mm or less (typically 5 μm to 1 mm), especially preferably a membranous ceramic member with a thickness of 0.5 mm or less (typically 50 μm to 0.5 mm).

The ceramic member in accordance with the present invention can be manufactured, for example, in the manner described below. Thus, powders (starting material powders) of compounds comprising metal atoms that will constitute the ceramic that is to be manufactured are mixed at the prescribed ratio. The mixture is molded and fired in an oxidizing atmosphere (for example, in air) or in an inactive gas atmosphere to obtain a ceramic. Here, powders comprising at least one of the oxides containing metal atoms that will constitute a ceramic, or compounds (carbonates, nitrates, sulfates, phosphates, acetates, oxalates, halides, hydroxides, oxyhalides, and the like) that can be converted into oxides by heating can be used as the aforesaid starting material powder. The starting material powders may also contain compounds (complex metal oxides, complex metal carbonates, and the like) containing metal atoms of no less than two types among the metal atoms that will constitute a ceramic.

The appropriate firing temperature differs depending on the composition of the ceramic, but is typically 1200-1800° C. (preferably 1400-1700° C.). Furthermore, the firing process can comprise at least one prefiring step and a main firing step conducted thereafter. In this case, the main firing step is conducted at the aforesaid firing temperature, and the prefiring step is preferably conducted at a firing temperature (for example, 800-1500° C.) lower than that of the main firing step.

The molding of the starting material powder or the molding of the prefired powder obtained by grinding the prefired product can be conducted by using a conventionally known molding method such as uniaxial compression molding, hydrostatic pressing, extrusion molding, and the like. A conventional binder can be used for such molding.

The ceramic member in accordance with the present invention can also contain components other than the ceramic represented by the aforesaid general formula, within a range in which the performance thereof (oxygen conductivity, electron conductivity, cracking prevention ability, carbon precipitation suppressing ability, and the like) is not degraded significantly.

"A catalyst for enhancing the permeation of oxygen ions" can be applied to the surface of the membranous ceramic member to enhance the permeation of oxygen ions. A compound comprising a metal of at least one type selected from the group including Pt, Pd, Ru, Au, Ag, Bi, Ba, V, Mo, Ce, Pr, Co, Rh, and Mn and/or the metal oxides (spinel-type complex oxide, perovskite-type complex oxide, and the like) can be used as the catalyst for enhancing the permeation of oxygen ions. Furthermore, at least one of the conventionally known oxygen ion conductors, for example, an LaSrCoO$_3$ type, an LaGaO$_3$ type, an LaCoO$_3$ type, an LaFeO$_3$ type, an SeFeO$_3$ type, and stabilized zirconia can also be used. Among them, the catalyst for enhancing the permeation of oxygen ions, which is preferably used, contains CaTiO$_3$ or a perovskite-type complex oxide represented by the formula $(La_xSr_{1-x})M'O_3$ (where $0 \leqq x \leqq 1$ and M' is at least one selected from Co, Cu, Fe, and Mn). The especially preferred catalyst contains $(La_xSr_{1-x})CoO_3$ (where $0.1 \leqq x < 1$).

The catalyst for enhancing the permeation of oxygen ions, such as $(La_xSr_{1-x})CoO_3$ is a catalyst (ceramic) which, by itself, has oxygen ion conductivity. However, when the ceramic member obtained by forming this ceramic (($La_xSr_{1-x})CoO_3$) into a membrane is exposed to a reducing atmosphere, cracks easily occur therein. The ceramic, in accordance with the present invention, can have a configuration in which a catalyst for enhancing the permeation of oxygen ions, with a composition of $(La_xSr_{1-x})CoO_3$ is applied to the membrane formed from a ceramic represented by $(Ln_{1-x}M_x)(Ti_{1-y}Fe_y)O_3$. As a result, it is possible to obtain a ceramic member in which both oxygen ion conductivity and cracking prevention ability can be demonstrated at a high level due to the synergistic effect of the cracking prevention ability of the ceramic represented by $(Ln_{1-x}M_x)(Ti_{1-y}Fe_y)O_3$ and the oxygen ion conductivity of the ceramic having a composition of $(La_xSr_{1-x})CoO_3$.

Such a catalyst for enhancing the permeation of oxygen ions may be applied to only one surface of the membranous ceramic member or to both surfaces. It is preferred that the catalyst be applied (coated) so as to cover the entire surface on one side or both sides of the ceramic member, but it may also be applied only to a partial region (for example, in the form of spots, stripes, a grid, or the like). No specific limitation is placed on the method for "applying" the catalyst to the surface of the ceramic member. For example, the target catalyst can be applied (coated) by preparing a slurry containing the catalyst powder, coating this slurry on the surface of the ceramic member and drying it. The applied catalyst powder may be thereafter additionally fired.

Further, "a catalyst for enhancing the oxidation reaction" can be applied to the surface of such a membranous ceramic member. The conventionally known oxidation catalysts and/or dehydrogenation catalysts such as compounds comprising at least one metal selected from the group including Ni, Rh, Ag, Au, Bi, Mn, V, Pt, Pd, Ru, Cu, Zn, Co, Cr, Fe, In-Pr mixtures, and In-Sn mixtures and/or the metal oxides can be used as the aforesaid catalyst for enhancing the oxidation reaction. Among them, Ni-based catalysts (catalysts composed based on Ni) or Rh-based catalysts (that is, catalysts composed based on Rh) are preferably used.

Such a catalyst for enhancing the oxidation reaction can be applied to one or both surfaces of the membranous ceramic member (to the entire surface or partial regions thereof), using a method identical to that used for applying the aforesaid catalyst for enhancing the permeation of oxygen ions. Furthermore, both the catalyst for enhancing the permeation of oxygen ions and the catalyst for enhancing the oxidation reaction can also be applied to one surface or both surfaces of the membranous ceramic member.

Catalysts for enhancing the permeation of oxygen ions and/or catalysts for enhancing the oxidation reaction may be disposed in the vicinity of the surface of the ceramic member and do not necessarily have to be directly applied to the surface of the ceramic member. For example, the aforesaid catalyst(s) may be supported by a porous support body, of the laminated oxygen ion conductive part, in accordance with the present invention. (For example, a catalyst layer is formed on the surface that is opposite the surface where the membranous ceramic member has been formed.) Alternatively, the catalytic effect can be used by employing a method such as filling the oxygen source supply chamber, or the oxidation reaction chamber, with ceramic pellets supporting those catalysts.

The oxygen ion permeation module in accordance with the present invention will be described below. In the oxygen ion permeation module in accordance with the present invention, the ceramic member is accommodated in a casing. Inside the casing, the oxygen source supply chamber and the oxidation reaction chamber are formed so that they are hermetically separated from each other by the ceramic member. The oxygen source supply chamber faces one of the surfaces of the ceramic member and the oxidation reaction chamber faces the other surface, and the two chambers are hermetically separated from each other by the ceramic member. The ceramic member is preferably formed to have a membranous shape. A module can be configured such that the above-described oxygen ion permeation-enhancing catalyst is applied to at least the surface of the membranous ceramic member on the side of the oxygen source supply chamber. There may be one ceramic member or several ceramic members accommodated in one module. Furthermore, one or several oxygen source supply chambers and oxidation reaction chambers may be provided in one module. The number of the oxygen source supply chambers provided in one module may be equal to or different from the number of the oxidation reaction chambers.

Ceramics having a perovskite-type crystal structure and a composition represented by the aforesaid general formulas (1) to (6) can, by themselves, have the properties of an oxygen ion permeation-enhancing catalyst. For this reason, the membranous ceramic member, the laminated oxygen ion conduction part, and the oxygen ion permeation module in accordance with the present invention, which are constituted, based on such ceramics, can demonstrate oxygen ion conductivity sufficient for practical use, even when the aforesaid oxygen ion permeation-enhancing catalyst is not used. Therefore, they can be advantageously used as structural parts of oxygen separators, oxidation reactors, and the like.

Figure 9:
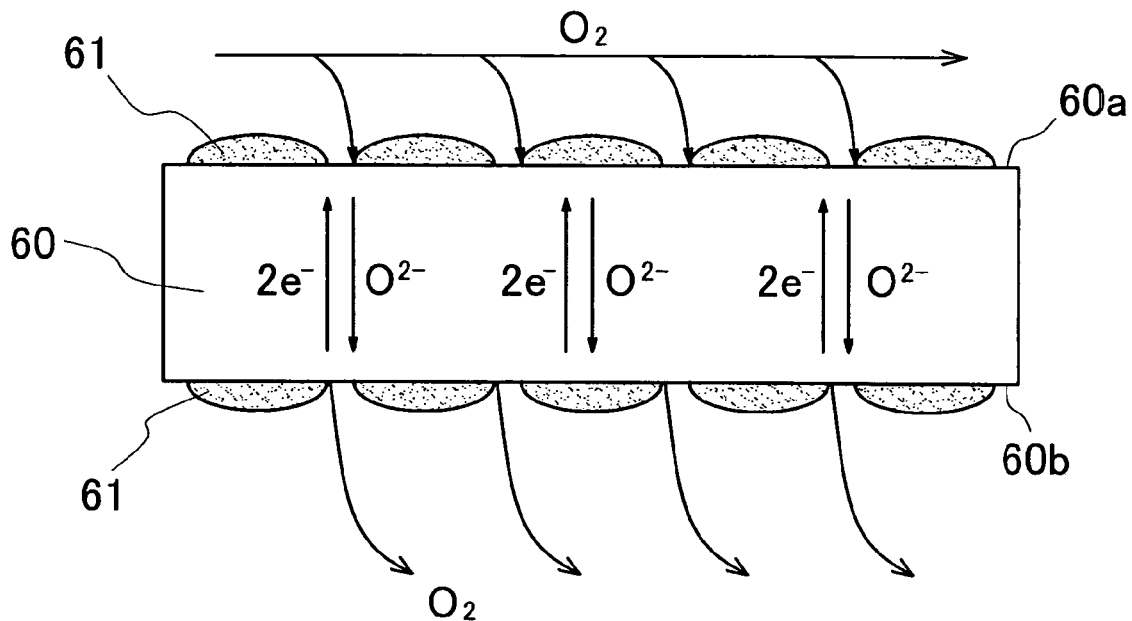
FIG. 9 is a schematic explanatory drawing illustrating the mode in which oxygen separation is performed with a ceramic member to which an oxygen ion permeation-enhancing catalyst is applied.

In the preferred oxygen ion permeation module used in the below-described oxygen separator, a membranous ceramic member is provided in which an oxygen ion permeation-enhancing catalyst (for example, $(La_xSr_{1-x})CoO_3$, where $0.1 \leq x < 1$) is applied at least to the surface of the ceramic member on the side of the oxygen source supply chamber (preferably, both on the surface on the side of the oxygen source supply chamber and on the surface on the side of the oxidation reaction chamber). FIG. 9 is an explanatory drawing illustrating schematically the mode in which oxygen is separated with a ceramic member 60 to both sides of which the oxygen ion permeation-enhancing catalyst 61 is applied. On one surface 60a (the surface on the side of the oxygen source supply chamber) of the ceramic member 60, oxygen molecules accept electrons and become oxygen ions. Those oxygen ions diffuse through the ceramic member 60 and reach the other surface 60b (surface on the side of the oxidation reaction chamber). Here, the oxygen ions discharge the electrons and become oxygen molecules. In this process, the reaction of oxygen ion generation from the oxygen molecules and/or the reaction of oxygen molecule generation from the oxygen ions, is enhanced by the oxygen ion permeation-enhancing catalyst 61.

Figure 10:
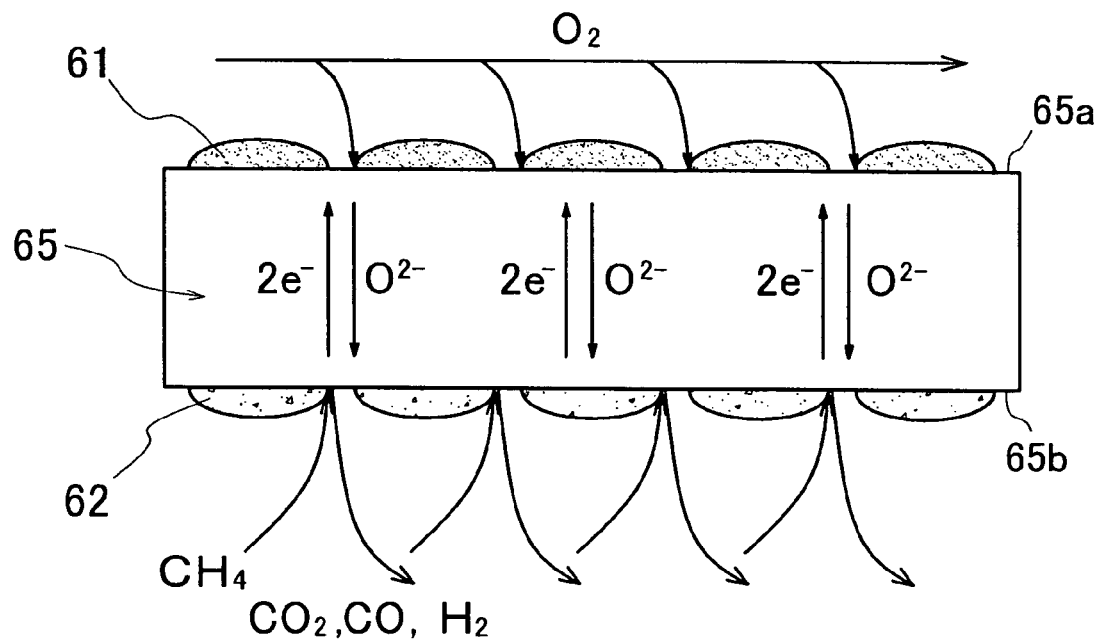
FIG. 10 is a schematic explanatory drawing illustrating the mode in which the partial oxidation reaction of methane is performed with a ceramic member to which an oxygen ion permeation-enhancing catalyst and an oxidation-enhancing catalyst are applied.
Figure 11:
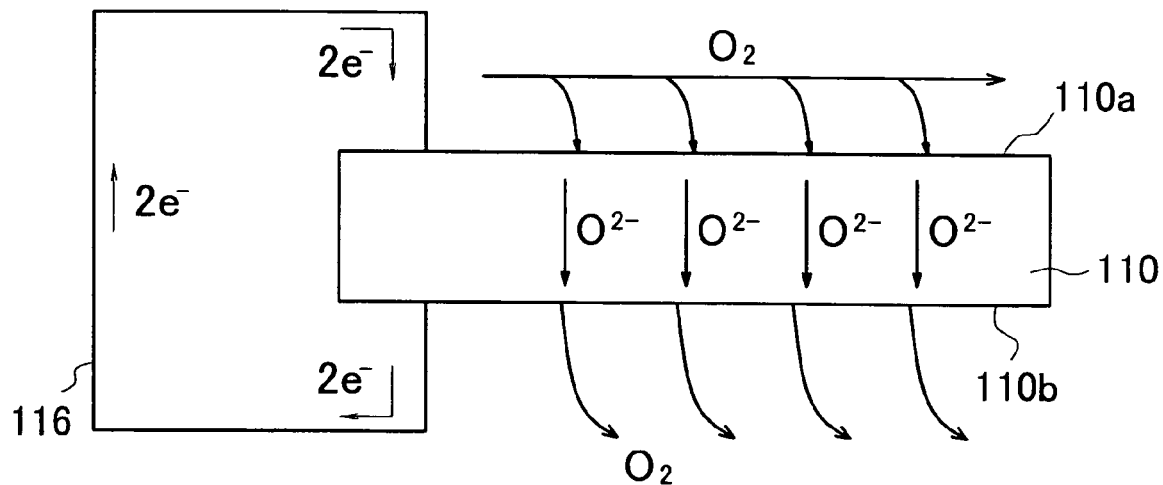
FIG. 11 is a schematic explanatory drawing illustrating the mode in which oxygen separation is performed with a ceramic member composed of zirconium oxide.
Figure 12:
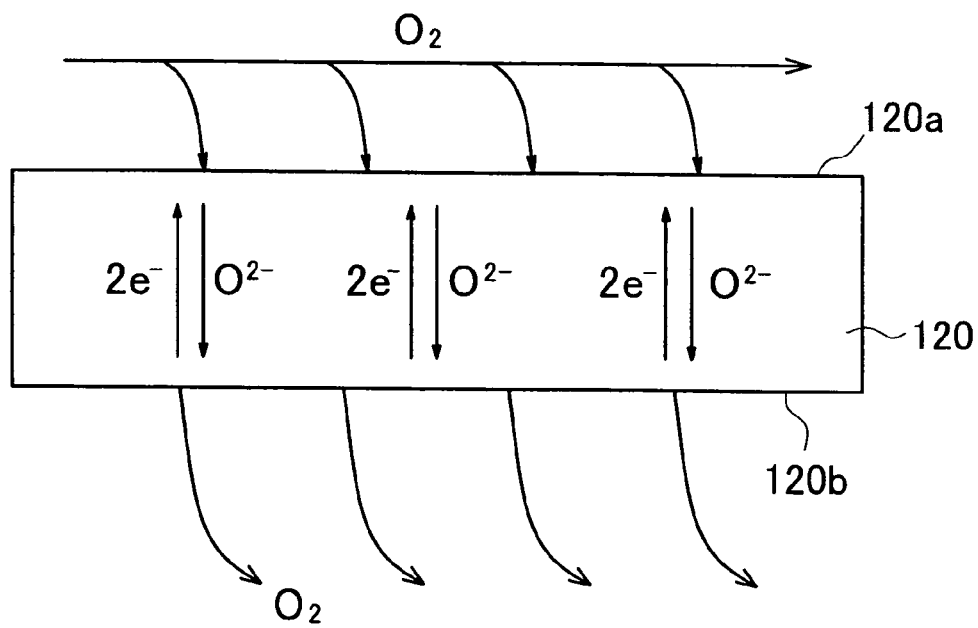
FIG. 12 is a schematic explanatory drawing illustrating the mode in which oxygen separation is performed with a ceramic member composed of an electron-oxygen ion mixed conductor.

In the preferred oxygen ion permeation module used in the below-described reactor for partial oxidation of hydrocarbons, a membranous ceramic member is provided in which an oxygen ion permeation-enhancing catalyst is applied to the surface on the side of the oxygen source supply chamber and an oxidation enhancing catalyst (for example, an Ni-based catalyst) is applied to the surface on the side of the oxidation reaction chamber. FIG. 10 is an explanatory drawing illustrating schematically the mode in which methane is partially oxidized with such a ceramic member 65. An oxygen ion permeation-enhancing catalyst 61 is applied to one surface 65a (the surface on the side of the oxygen source supply chamber) of the ceramic member 65, and the oxidation-enhancing catalyst 62 is applied to the other surface 65b (the surface on the side of the oxidation reaction chamber. On one surface 65a, oxygen molecules accept electrons and become oxygen ions. These oxygen ions diffuse through the ceramic member 60 and reach the other surface 65b. Here, they are brought into contact with and oxidize methane, producing reaction products such as CO, $CO_2$, and $H_2$. In this process, the reaction of oxygen ion generation from the oxygen molecules and/or the partial oxidation reaction of methane with the oxygen ions is enhanced by the oxygen ion permeation-enhancing catalyst 61 and the oxidation-enhancing catalyst 62.

The oxygen separator in accordance with the present invention will be described below.

The oxygen separator in accordance with the present invention comprises a means for causing an oxygen-containing gas to flow through to the oxygen source supply chamber of the above-described oxygen permeation module, and bringing the gas into contact with the surface of the aforesaid ceramic member on the side of the oxygen source supply chamber. The gas (an oxygen-containing gas) supplied by this means typically contains 10-100 vol. % oxygen. The oxygen-containing gas preferably used is air. The pressure of the atmosphere inside the oxygen source supply chamber when the aforesaid oxygen separator is used (the pressure of the oxygen-containing gas) may be a normal pressure (atmospheric pressure), or may be an increased or reduced pressure. Typically, it is a normal pressure or an increased pressure, preferably, a normal pressure.

This oxygen separator comprises a means for causing "a gas (the gas of the oxidation reaction chamber) with a partial pressure of oxygen lower than that on the side of the oxygen source supply chamber" to flow through to the oxidation reaction chamber of the oxygen permeation module, and bringing it into contact with the surface of the ceramic member on the side of the oxidation reaction chamber. A gas with an oxygen content lower than that on the side of the oxygen source supply chamber (for example, 0.01 vol. % or less, the gas may also contain substantially no oxygen) or a gas with a pressure lower than that on the side of the oxygen source supply chamber is preferably used as the oxidation reaction chamber gas. Furthermore, the pressure of the atmosphere (gas that flows through to the oxidation reaction chamber) may be a normal pressure or may be increased or reduced. Typically, it is a normal pressure or a reduced pressure, preferably, a normal pressure.

From the standpoint of increasing the oxygen permeation efficiency in the oxygen separator, it is preferred that the oxygen separator be used (operated) in a state in which the difference in the partial pressure of oxygen between the oxygen source supply chamber and the oxidation reaction chamber be large. For example, if the partial pressure of oxygen on the side of the oxygen source supply chamber is assumed to be 1, then the partial pressure of oxygen on the side of the oxidation reaction chamber is preferably not higher than $10^{-2}$, more preferably not higher than $10^{-3}$. Furthermore, from the standpoint of decreasing the load (stresses) applied to the ceramic member, it is preferred that the difference in pressure between the oxygen source supply chamber and the oxidation reaction chamber be small. For example, the pressure ratio is preferably 2 or less, more preferably 1.2 or less. It is even more preferred that the pressure in the oxygen source supply chamber be equal to that in the oxidation reaction chamber.

With the oxygen separator in accordance with the present invention, in the oxidation reaction chamber, oxygen molecules are generated from oxygen ions that permeated through the ceramic member from the oxygen source supply chamber to the oxidation reaction chamber. The oxygen molecules are removed together with the oxidation reaction chamber gas from the oxidation reaction chamber with the oxidation reaction chamber gas circulation means. As a result, oxygen can be separated from the oxygen-containing gas that was supplied to the oxygen source supply chamber. Further, the oxygen separator may be provided with one or several oxygen permeation modules.

This oxygen separator is typically used under the following conditions. That is, the temperature of the ceramic member during oxygen separation is preferably 300° C. or higher (typically 300-1500° C.), preferably 500° C. or higher (typically 500-1500° C.), more preferably 800° C. or higher (typically 800-1200° C.). The flow rate of the oxygen-containing gas supplied into the oxygen source supply chamber by the oxygen source supply means (for example, a supply source such as an air cylinder or air compressor and a valve connected thereto) can be, for example, 10-5000 mL/min. The flow rate of the oxygen (oxygen supply rate) in the oxygen-containing gas supplied into the oxygen source supply chamber is preferably within a range of 50-2500 mL/min. Furthermore, the flow rate of the gas supplied into the oxidation reaction chamber by the oxidation reaction chamber gas circulation means can be, for example, 1-500 mL/min.

The oxygen separator in accordance with the present invention can separate oxygen (calculated as oxygen molecules) at a rate of 15 μmol/min or more (more preferably 20 μmol/min or more) per unit surface area ($cm^2$) of the ceramic member at a temperature of 900° C., for example.

The oxidation reactor in accordance with the present invention will be described below.

The reactor in accordance with the present invention comprises an oxygen source supply means identical to that of the aforesaid oxygen separator. Further, this reactor also comprises an oxidation-target gas supply means that supplies "a gas (an oxidation reaction chamber gas) that contains an oxidation-target gas (for example, a hydrocarbon) and has a partial pressure of oxygen lower than that in the oxygen source supply chamber" into the oxidation reaction chamber of the oxygen permeation module and brings it into contact with the surface of the ceramic member on the side of the oxidation reaction chamber.

With the reactor provided in accordance with the present invention, it is possible to conduct "a reaction of partial oxidation of hydrocarbons", such as the reaction of generating a synthetic gas (a gas containing $H_2$ and CO at a volume ratio of 2:1) from methane, natural gas, or the like, and the reaction of generating unsaturated hydrocarbons (olefins and the like) from saturated or unsaturated hydrocarbons with a low molecular weight (for example, ethane, propane, ethyl benzene, or the like). Further, this oxidation reactor can also be used as a reactor for oxidation reactions of other types in which oxygen ions participate. Examples of such oxidation reactions include the oxidation of reducible gases other than hydrocarbons (for example, the generation of $H_2O$ by oxidation of hydrogen gas), the substitution of aromatic compounds, and the like. The composition and flow rate of the gas supplied into the oxidation reaction chamber, the composition of the ceramic constituting the ceramic member, the presence and type of the oxidation-enhancing catalyst, the reaction temperature, etc. are set appropriately according to the type of the aforesaid oxidation reaction. The preferred partial pressure of oxygen in the gas (that contains an oxidation-target gas such as a hydrocarbon) to be supplied to the oxidation reaction chamber, and the preferred difference in pressure between the oxygen supply source chamber and the oxidation reaction chamber are identical to those described hereinabove with reference to the oxygen separator. This reactor may comprise one or several oxygen permeation modules.

Such an oxidation reactor (for example, a reactor for partial oxidation of hydrocarbons) is typically used under the following conditions. That is, the preferred temperature of the ceramic member during the oxidation reaction is usually 300° C. or higher (typically 300-1500° C.), preferably 500° C. or higher (typically 500-1500° C.), more preferably 800° C. or higher (typically 800-1200° C.). The flow rate of the oxygen-containing gas supplied into the oxygen source supply chamber by the oxygen source supply means can be, for example, 10-5000 mL/min (preferably 50-2500 mL/min). The flow rate of the oxygen (oxygen supply rate) in the oxygen-containing gas supplied into the oxygen source supply chamber is preferably within a range of 10-1500 mL/min (preferably 50-1000 mL/min). Furthermore, the flow rate of the gas supplied into the oxidation reaction chamber (gas containing the oxidation-target gas such as a hydrocarbon) by the oxidation-target gas supply means (for example, a cylinder containing the oxidation-target gas such as a hydrocarbon, and a valve connected thereto) can be, for example, 1-500 mL/min (preferably 1-250 mL/min, more preferably 5-60 mL/min). The flow rate of the oxidation-target gas in the gas supplied into the oxidation reaction chamber is preferably within a range of 1-500 mL/min (more preferably 1-250 mL/min, even more preferably 1-50 mL/min).

When the reactor is a reactor for partial oxidation of hydrocarbons, the flow rate of oxygen supply is preferably no less than 2 times, more preferably no less than 5 times, even more preferably no less than 10 times the flow rate of hydrocarbons (the hydrocarbon flow rate) in the gas supplied by the oxidation-target gas supply means. As a result, the supplied hydrocarbon can be converted into a partial oxide thereof with good efficiency. The reactor (for example, a reactor for partial oxidation of hydrocarbons) in accordance with the present invention can be used for a reaction in which oxygen (calculated as oxygen molecules) is caused to permeate from the oxygen source supply chamber to the oxidation reaction chamber at a rate of 25 μmol/min or more per unit surface area ($cm^2$) of the ceramic member at a temperature of 1000° C., for example, and to oxidize (for example, partially oxidize) the oxidation-target gas (for example, a hydrocarbon). In a more preferred embodiment, the reactor can be used for a reaction in which oxygen is caused to permeate from the oxygen source supply chamber to the oxidation reaction chamber at a rate of 50 μmol/min or more (in an even more preferred embodiment, 80 μmol/min or more) per unit surface area, and oxidize the oxidation-target gas.

An embodiment of the oxygen ion permeation module provided in accordance with the present invention and examples of the devices comprising such a module will be described below.

FIG. 1 shows an example of an oxygen ion permeation module using a ceramic member formed to have a flat shape. This oxygen ion permeation module 1 comprises a flat ceramic member 10 and a casing 40 for accommodating the ceramic member 10. The casing 40 is formed from a dense ceramic such as mullite. The casing 40 comprises an oxygen source supply chamber casing 22 positioned on the side of one of the surfaces of the ceramic member 10 and an oxidation reaction chamber casing 32 positioned on the side of the other surface of the ceramic member 10. The oxygen source supply chamber casing 22 comprises a closed-end cylindrical outer tube 24, one end of which is hermetically bonded to one of the surfaces 10a of the ceramic member 10; and a cylindrical inner tube 26 one end of which penetrates through the bottom of the outer tube 24 and is hermetically inserted into the outer tube 24. A throughhole 25 is formed in the side wall of the outer tube 24. The oxidation reaction chamber casing 32 similarly comprises a closed-end outer tube 34, one end of which is hermetically bonded to the other surface 10b of the ceramic member 10; and a cylindrical inner tube 36, one end of which penetrates through the bottom of the outer tube 34 and is hermetically inserted into the outer tube 34. A throughhole 35 is formed in the side wall of the outer tube 34. The oxygen source supply chamber 20 is separated and formed by the oxygen source supply chamber casing 22 and the ceramic member 10. Further, the oxidation reaction chamber 30 is separated and formed by the oxidation reaction chamber casing 32 and the ceramic member 10.

Figure 2:
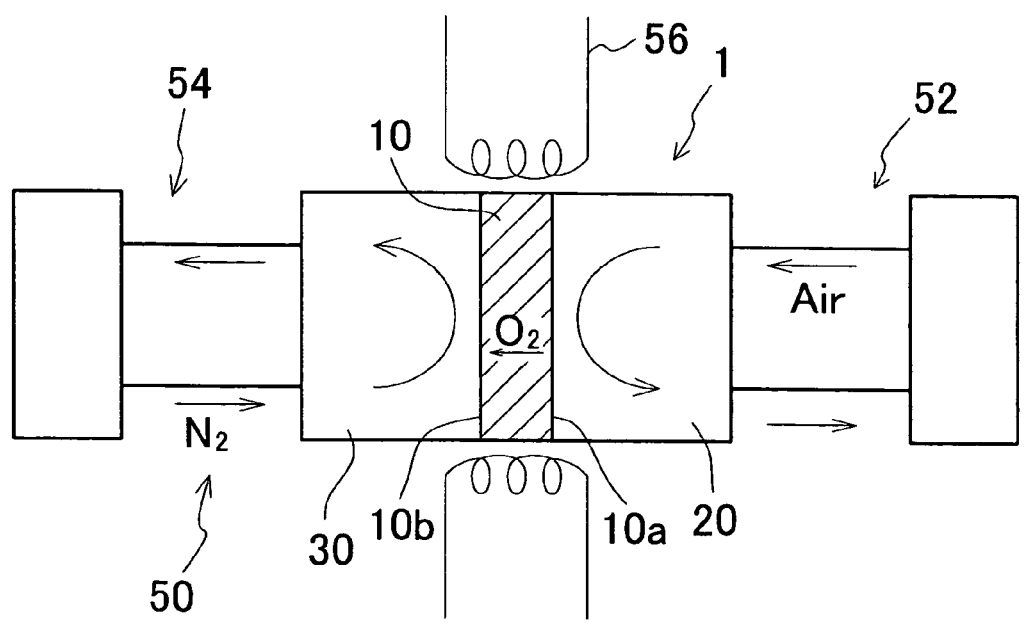
FIG. 2 is a schematic diagram illustrating a general configuration of the oxygen separator in accordance with the present invention.

FIG. 2 schematically illustrates the oxygen separator configured using the oxygen ion permeation module shown in FIG. 1. In this oxygen separator 50, an oxygen source supply means 52 for causing the air to flow to the oxygen source supply chamber 20 and bringing it into contact with one surface 10a of the ceramic member 10 is connected to the oxygen source supply chamber 20 of the oxygen ion permeation module 1. The oxygen source supply means 52 is constructed, as shown in FIG. 1, so that the oxygen-containing gas (in this case, air) is supplied from the other end 26b of the inner tube 26 into the oxygen source supply chamber 20 and discharged from the throughhole 25 of the outer tube 24. On the other hand, as shown in FIG. 2, an oxidation reaction chamber gas circulation means 54 for causing nitrogen gas to flow into the oxidation reaction chamber 30 and bringing it into contact with the other surface 10b of the ceramic member 10 is connected to the oxidation reaction chamber 30 of the oxygen ion permeation module 1. This oxidation reaction chamber gas circulation means 54, is constructed, as shown in FIG. 1, so that the oxidation reaction chamber gas (in this case, nitrogen) is supplied from the throughhole 35, of the outer tube 34, into the oxidation reaction chamber 30 and discharged from the other end 36b, of the inner tube 36. Further, the oxygen separator 50 shown in FIG. 2 also comprises a heating means (a heater or the like) for heating the ceramic member 10 to the desired temperature.

The air and nitrogen are caused by the oxygen source supply means 52 and the oxidation reaction chamber gas circulation means 54 to flow through the oxygen ion permeation module 1, while the ceramic member 10 is maintained at the prescribed usage temperature (for example, 500° C. or higher) with the heating means 56. As a result, the oxygen that was contained in the air supplied to the oxygen source supply chamber 20 becomes oxygen ions and permeates through the ceramic member 10. Those oxygen ions become oxygen molecules in the oxidation reaction chamber 30 and are extracted to the outside. Oxygen separation is thus conducted.

Figure 3:
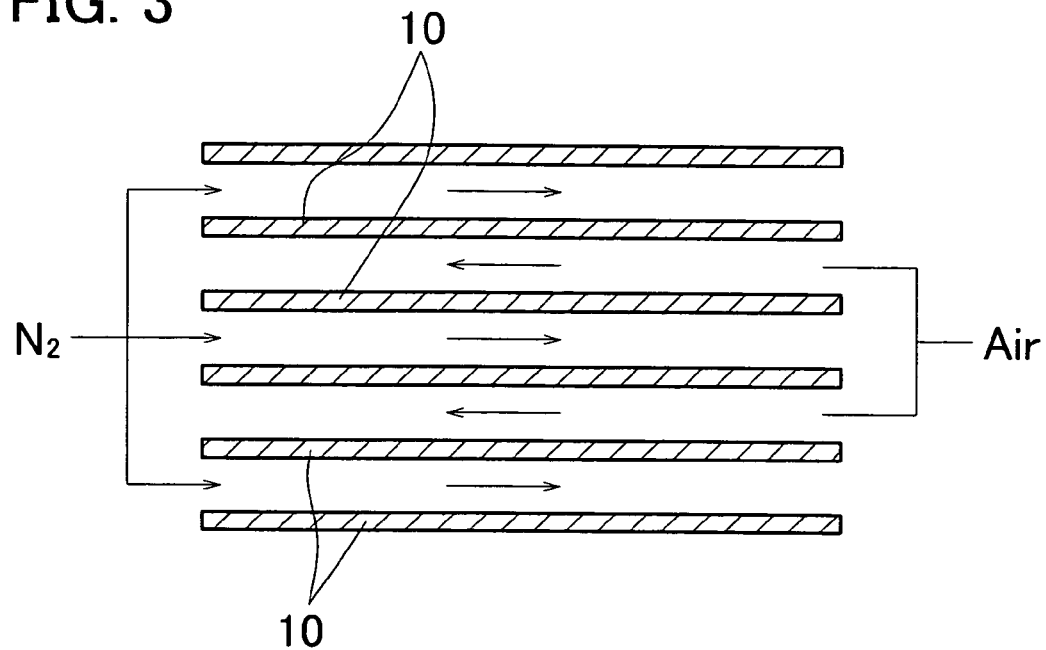
FIG. 3 is a schematic cross-sectional view illustrating the main components in another configuration example of the oxygen ion permeation module in accordance with the present invention.
Figure 4:
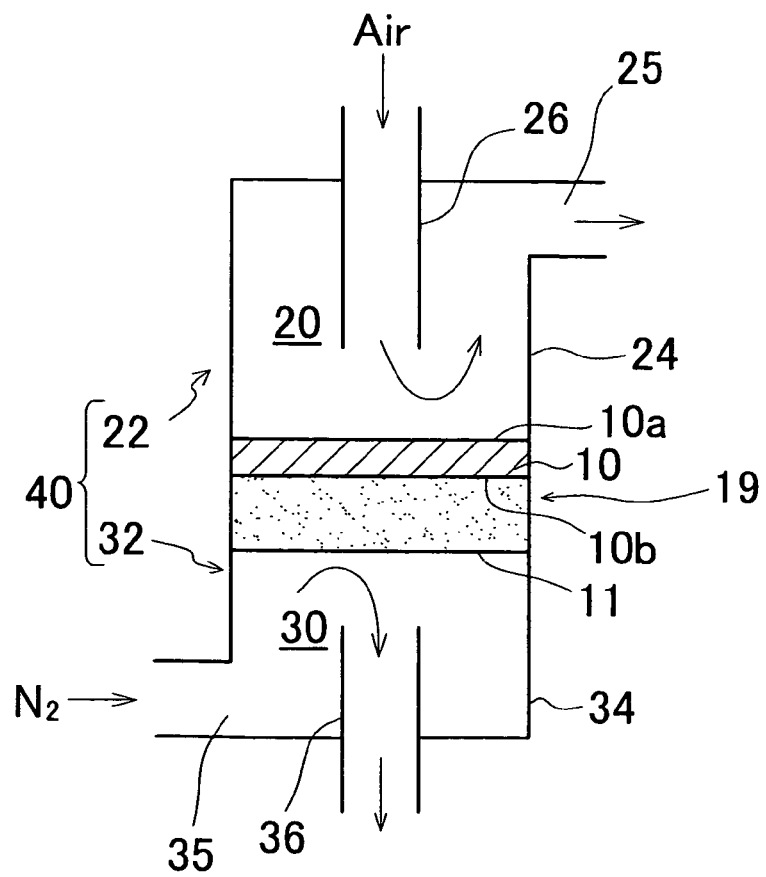
FIG. 4 is a schematic cross-sectional view illustrating the main components in another configuration example of the oxygen ion permeation module in accordance with the present invention.

The oxygen ion permeation module 1 shown in FIG. 1 uses one ceramic member 10 formed to have a flat shape. However, as shown in FIG. 3, an oxygen ion permeation module may also be configured so that a plurality of flat ceramic members 10 are arranged in a stack and the air (oxygen-containing gas) and nitrogen (oxidation reaction chamber gas) are alternately passed through the channels formed between the adjacent ceramic members 10. Furthermore, the oxygen ion permeation module 1 shown in FIG. 1 may also have a configuration comprising a stack-type oxygen ion conductive part 19 provided with a porous support body 11 for mechanically supporting the ceramic member 10 on the side of the other surface 10b of the ceramic member 10, as shown in FIG. 4. Further, in the configuration shown in FIG. 4, the porous support body 11 is provided on the side of the other surface 10b of the ceramic member 10, but the porous support body 11 may also be provided on the side of the first surface 10a or on both surfaces of the ceramic member 10. Moreover, the support may be provided for the entire surface of the ceramic member, as shown in FIG. 4, or it may support only part of the surface.

Figure 5:
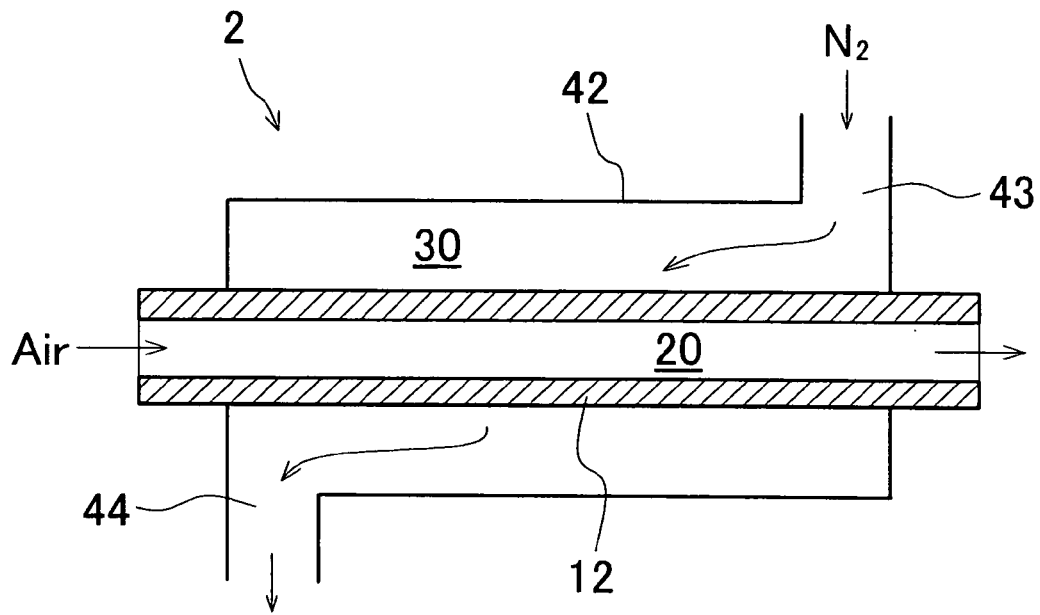
FIG. 5 is a schematic cross-sectional view illustrating the main components in another configuration example of the oxygen ion permeation module in accordance with the present invention.

FIG. 5 shows an example of the oxygen ion permeation module using the ceramic member 12 formed into a tube. This oxygen ion permeation module 2 comprises a tubular ceramic member 12 and a casing 42 for accommodating the ceramic member 12. The casing 42 is formed from a dense ceramic such as mullite. The casing 42 has a hollow cylindrical shape and the tubular (open-end tube) ceramic member 12 passes in the axial direction through both ends of the casing. Two throughholes 43, 44 are formed in the side surface of the casing 42. In this oxygen ion permeation module 2, the oxygen source supply chamber 20 is separated and formed by the ceramic member 12 itself, inside the tubular ceramic member 12. Further, a tubular oxidation reaction chamber 30 is separated and formed by the casing 42 and the ceramic member 12. This oxygen ion permeation module 2 can be used in the oxygen separator 50 shown in FIG. 2 instead of the oxygen ion permeation module 1 shown in FIG. 1.

Figure 6:
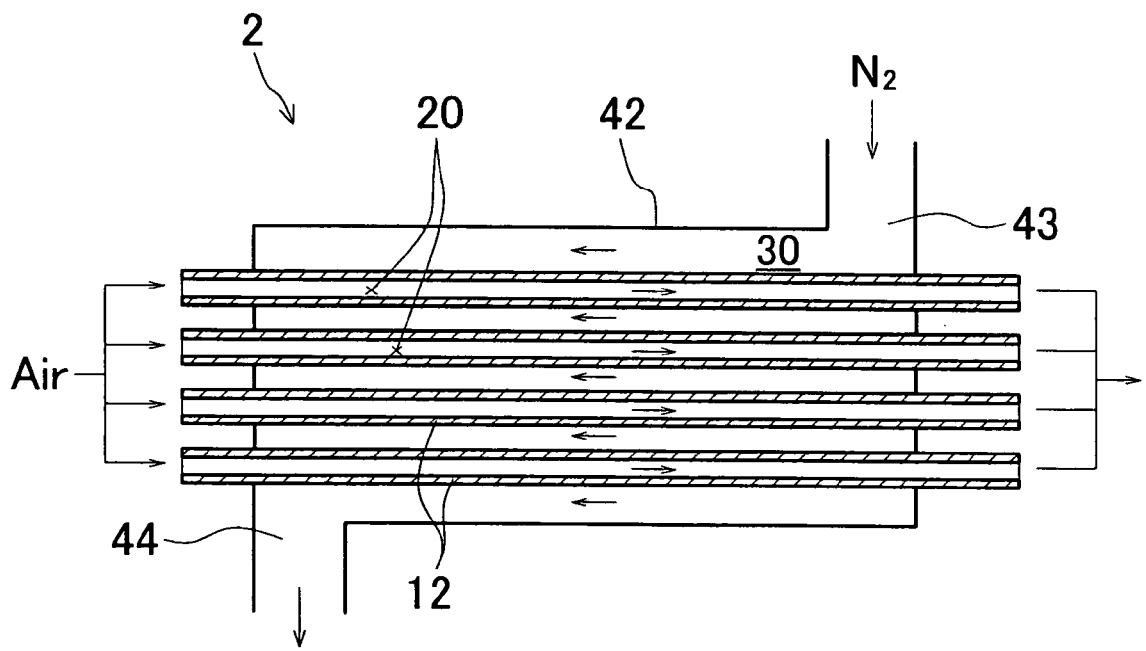
FIG. 6 is a schematic cross-sectional view illustrating the main components in another configuration example of the oxygen ion permeation module in accordance with the present invention.

Further, a single ceramic member 12 formed into a tube (open-end tube) was used in the oxygen ion permeation module 2 shown in FIG. 5, but an oxygen ion permeation module with a structure in which a plurality of ceramic members 12 pass through in the axial direction of the casing 42, as shown in FIG. 6, may also be used. In such an oxygen ion permeation module, the inside of each ceramic member 12 is used as the oxygen source supply chamber 20, and the space between the casing 42 and the ceramic member 12 is used as the oxidation reaction chamber 30.

Figure 7:
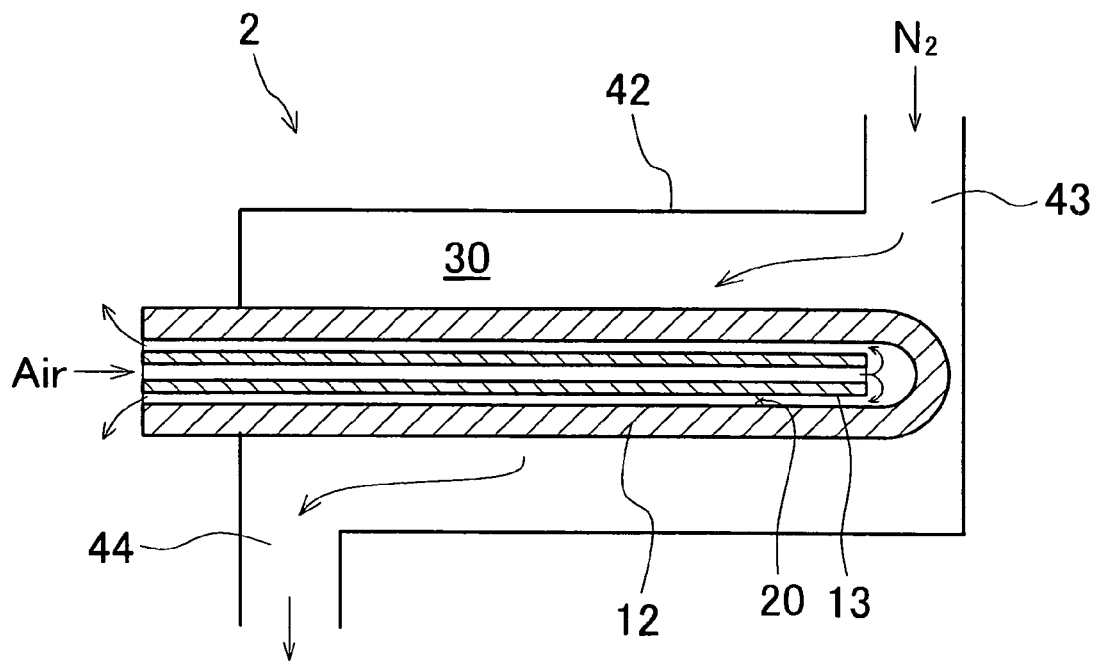
FIG. 7 is a schematic cross-sectional view illustrating the main components in another configuration example of the oxygen ion permeation module in accordance with the present invention.

Furthermore, while in the oxygen ion permeation module 2 shown in FIG. 5 and FIG. 6, a ceramic member 12 having both ends open passes through the casing 42, a configuration can also be used in which a ceramic member having one end (the distal end) closed (closed-end tubular ceramic member) 12 can also be provided inside the casing 42, as shown in FIG. 7.

The number of closed-end tubular ceramic members 12 provided inside one casing 42, may be more then one. An example of the configuration comprising a single ceramic member 12 is shown in FIG. 7. With such a configuration, the number of places where the closed-end ceramic member 12 and the casing 42 are sealed can be reduced in comparison with the configuration in which the open-end ceramic member 12 passes through the casing 42. Accordingly, an oxygen ion permeation module 2 with a tightly sealed casing 42 can be obtained. As shown in FIG. 7, an inner tube 13 with both ends open may be disposed inside the closed-end tubular ceramic member 12. The distal end of the inner tube 13 extends to the vicinity of the distal end of the closed-end ceramic member. Furthermore, a tubular gap is formed between the inner periphery of the closed-end ceramic member 12 and the outer periphery of the inner tube 13. If air is supplied inside the inner tube 13 and then passed through the aforesaid gap from the distal end of the inner tube 13, then at least part of the oxygen contained in the supplied air will be converted into oxygen ions and permeates through the closed-end tubular ceramic member 12. Those oxygen ions become oxygen molecules inside the oxidation reaction chamber 30 and are extracted to the outside.

Figure 8:
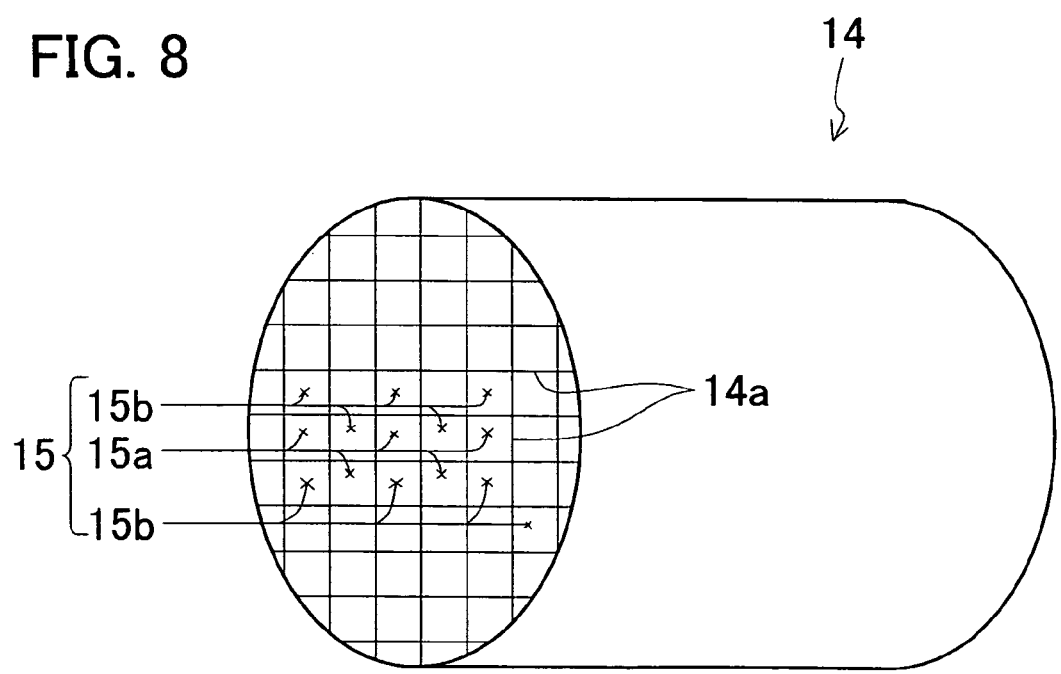
FIG. 8 is a schematic cross-sectional view illustrating the main components in another configuration example of the oxygen ion permeation module in accordance with the present invention.

Further, as shown in FIG. 8, an oxygen permeation module can also be configured using a ceramic member 14 formed to have a honeycomb shape. This honeycomb ceramic member 14 has a cylindrical columnar outer shape. A plurality of channels 15 is formed inside the ceramic member so as to pass through the ceramic member 14 in the axial direction, those channels being separated by partitions 10a. The channels can be generally classified into channels 15a (oxygen source supply chambers) for passing oxygen-containing gas and channels 15b (oxidation reaction chamber) for passing the oxidation reaction chamber gas. The channels 15a and 15b are arranged alternately. In the oxygen permeation module comprising such ceramic member 14, the oxygen-containing gas and the oxidation reaction chamber gas are passed independently through those channels 15a and 15b, and such a module can be used as a structural element of the oxygen separator 50 as shown in FIG. 2.

Any of the above-described oxygen ion permeation modules, can also be used by reversing the position of the oxygen source supply chamber, and the position of the oxidation reaction chamber. For example, in the oxygen ion permeation module 2 shown in FIG. 5, the inside of the ceramic member 12 may be used as the oxidation reaction chamber 30, and the space between the ceramic member 12 and the casing 42 may be used as the oxygen source supply chamber 20. Furthermore, the flow direction of the oxygen-containing gas and the oxidation reaction chamber gas is not limited to that shown in the Figures. For example, in the oxygen ion permeation module 2 shown in FIG. 5, nitrogen may be supplied from the throughhole 44 and discharged from the throughhole 42. Moreover, in the above-described oxygen separator, the outer electrodes and outer circuits for short circuiting the two surfaces of the ceramic member were not used, but a device may also be configured in which they are used for short-circuiting both surfaces of the ceramic member. All of the above-described oxygen separators can be used as oxidation reactors (for example, reactors for partial oxidation of hydrocarbons) or other chemical reactors by supplying, for example, a hydrocarbon-containing gas into the oxidation reaction chamber.

The present invention will be described below in greater detail based on working examples.

TEST EXAMPLE 1

Fabrication of Sintered Body (1)

$La_2O_3$, $SrCO_3$, $TiO_2$ and $Fe_2O_3$ as starting material powders were mixed so as to obtain stoichiometric ratios of x=0.1 and y=0.9 in the formula $(La_{1-x}Sr_x)(Ti_{1-y}Fe_y)O_3$ representing the composition of the sintered body obtained after firing. The mixture was prefired at a temperature of 1000° C. in air, and the obtained prefired material was ground and molded into a disk with a diameter of 22 mm and a thickness of 1.5 mm. A sintered body of Test Example 1 was fabricated by firing the molded body at a temperature of 1600° C. in air.

TEST EXAMPLE 2 to 4

Fabrication of Sintered Bodies (2)-(4)

$La_2O_3$, $SrCO_3$, $TiO_2$ and $Fe_2O_3$ as starting material powders were mixed so as to obtain stoichiometric ratios of x and y of 0.6 and 0.9, respectively (Test Example 2), 0.9 and 0.9 (Test Example 3), and 0.6 and 0.5 (Test Example 4) in the aforesaid chemical formula. With respect to other conditions, the sintered bodies of Test Examples 2 to 4 were fabricated in the same manner as in Test Example 1.

TEST EXAMPLE 5

Fabrication of Sintered Body (5)

$La_2O_3$, $CaCO_3$, $TiO_2$ and $Fe_2O_3$ as starting material powders were mixed so as to obtain stoichiometric ratios of x=0.5 and y=0.9 in the formula $(La_{1-x}Ca_x)(Ti_{1-y}Fe_y)O_3$ representing the composition of the sintered body obtained after firing. With respect to other conditions, the sintered body of Test Example 5 was fabricated in the same manner as in Test Example 1.

TEST EXAMPLE 6

Fabrication of Sintered Body (6)

The sintered body of Test Example 6 was fabricated in the same manner as in Test Example 5, except that $BaCO_3$ was used as the starting material instead of $CaCO_3$.

TEST EXAMPLE 7

Evaluation of Electric Conductivity

The electric conductivity of the sintered bodies obtained in Test Example 1 was measured. The measurements were conducted using the following method. That is, a sample in the form of a rectangular parallelepiped was cut out of each sintered body. A platinum paste serving as an electrode was applied to those samples, then platinum wires were connected and firing was conducted at a temperature of 850-1100° C. The specific conductance $\sigma$ ($S/cm^2$) was then determined by measuring the electric resistance of the samples in an apparatus in which the partial pressure of oxygen and temperature could be adjusted to any value. The relationship between the temperature and specific conductance $\sigma$ obtained at a constant partial pressure of oxygen $P_{O2}$ (approximately 0.1 Pa (approximately $10^{-6}$ atm)) is shown in Table 1, and the relationship between the specific conductance $\sigma$ and the partial pressure of oxygen $P_{O2}$ at a constant temperature (800° C.) is shown in Table 2.

TABLE 1

| Temperature (° C.) | log σ (S/cm²) |
|---|---|
| 550 | −0.7 |
| 600 | −0.6 |
| 650 | −0.6 |
| 700 | −0.5 |
| 750 | −0.4 |
| 800 | −0.3 |
| 850 | −0.2 |
| 900 | −0.2 |

Partial pressure of oxygen $PO_2$ is approximately 0.1 Pa

TABLE 2

| log $P_{O2}$ (atm) | log σ (S/cm²) |
|---|---|
| 0.1 | 0.7 |
| −0.7 | 0.5 |
| −6.4 | −0.3 |
| −13.5 | −1.0 |
| −14.2 | −1.0 |
| −17.1 | −1.0 |
| −22.0 | −0.8 |
| −26.0 | −0.2 |

Temperature 800° C.

As shown in Table 1 and Table 2, the sintered bodies obtained in Test Example 1 demonstrated good electron-conductive oxygen ion conductivity in a high-temperature range. This result indicates that the sintered bodies of Test Example 1 can be used for causing the permeation of oxygen ions, without short-circuiting the two surfaces of the sintered body, for example, with outer electrodes or outer circuits.

TEST EXAMPLE 8

Evaluation of Oxygen Separation Ability

Ceramic members for oxygen separation were fabricated by applying $(La_{0.7}Sr_{0.3})CoO_3$, as an oxygen ion permeation-enhancing catalyst to both surfaces of each sintered body obtained in Test Examples 1 thorough 6. Then, oxygen ion permeation modules 1 with the configuration shown in FIG. 1 were fabricated using those ceramic members. Air as the oxygen-containing gas (partial pressure of oxygen approximately 200 hPa (approximately 0.2 atm)) was supplied at a flow rate of 100 mL/min into the oxygen source supply chamber 20 of the oxygen ion permeation module 1. Further, nitrogen (partial pressure of oxygen approximately 0.1 Pa (approximately $10^{-5}$ atm)) as an oxidation reaction chamber gas was supplied at a flow rate of 20 mL/min into the oxidation reaction chamber 30. In this state, the temperature of the oxygen ion permeation module 1 (ceramic material 10) was adjusted to 800° C. and maintained for 30 min. Then, the quantity of oxygen contained in the oxidation reaction chamber gas released from the oxidation reaction chamber 30 was measured by gas chromatography, and the amount of oxygen (calculated as oxygen molecules; μmol/min-cm²) that permeated through the ceramic member 10 at a temperature of 800° C. was evaluated. Similarly, the amounts of oxygen that permeated at a temperature of 850° C. and 900° C. were evaluated. The results are shown in Table 3.

TABLE 3

| | Ceramic composition | | | Oxygen permeation rate (μmol/cm²-min) | | |
|---|---|---|---|---|---|---|
| | M | x | y | 800° C. | 850° C. | 900° C. |
| Working Example 1 | Sr | 0.1 | 0.9 | 16 | 17 | 20 |
| Working Example 2 | Sr | 0.6 | 0.9 | 24 | 25 | 25 |
| Working Example 3 | Sr | 0.9 | 0.9 | 31 | 33 | 34 |
| Working Example 4 | Sr | 0.6 | 0.5 | 22 | 24 | 24 |
| Working Example 5 | Ca | 0.5 | 0.9 | 25 | 27 | 26 |
| Working Example 6 | Ba | 0.5 | 0.9 | 20 | 20 | 19 |

As shown in Table 3, all the ceramic members using the sintered bodies of Test Examples 1 through 6 have good oxygen permeability. This result leads to the conclusion that those ceramic members have excellent oxygen separation ability.

TEST EXAMPLE 9

Evaluation of Hydrocarbon Partial Oxidation Ability (1)

Ceramic members for partial oxidation of hydrocarbons were fabricated by applying (La, Sr)CoO₃ as an oxygen ion permeation-enhancing catalyst to the surface, on the side of the oxygen source supply chamber, of each sintered body obtained in Test Examples 1 through 6, and applying an Ni-containing catalyst serving as an oxidation-enhancing catalyst to the surface on the side of the oxidation reaction chamber. The oxygen ion permeation modules 1 with the configuration shown in FIG. 1 were fabricated in the same manner as in Test Example 8 using those ceramic members. Air as an oxygen-containing gas (partial pressure of oxygen approximately 200 hPa (approximately 0.2 atm)) was supplied at a flow rate of 100 mL/min into the oxygen source supply chamber 20 of the oxygen ion permeation module 1. Further, a methane-nitrogen gas mixture (methane:nitrogen volume ratio was 1:1) as the oxidation reaction chamber gas was supplied at a flow rate of 5-20 mL/min into the oxidation reaction chamber 30. In this state, the temperature of the oxygen ion permeation module 1 (ceramic member 10) was adjusted to 900° C. and maintained for 30 min. Then, the quantity of CO and $CO_2$ contained in the oxidation reaction chamber gas discharged from the oxidation reaction chamber 30 was measured by gas chromatography, and the amount of oxygen (calculated as oxygen molecules; μmol/min-cm²) that permeated through the ceramic member 10 at a temperature of 900° C. was evaluated. Practically no oxygen was contained in the gas discharged from the oxidation reaction chamber. Similarly, the amount of oxygen that permeated at a temperature of 1000° C. was evaluated. The results are shown in Table 4.

TABLE 4

| | Ceramic composition | | | Oxygen permeation rate (μmol/cm²-min) | |
|---|---|---|---|---|---|
| | M | x | y | 900° C. | 1000° C. |
| Working Example 1 | Sr | 0.1 | 0.9 | 24 | 25 |
| Working Example 2 | Sr | 0.6 | 0.9 | 52 | 54 |
| Working Example 3 | Sr | 0.9 | 0.9 | 55 | 53 |
| Working Example 4 | Sr | 0.6 | 0.5 | 45 | 52 |

TABLE 4-continued

| | Ceramic composition | | | Oxygen permeation rate ($\mu$mol/cm$^2$-min) | |
|---|---|---|---|---|---|
| | M | x | y | 900° C. | 1000° C. |
| Working Example 5 | Ca | 0.5 | 0.9 | 54 | 55 |
| Working Example 6 | Ba | 0.5 | 0.9 | 43 | 45 |

As shown in Table 4, all the ceramic members using the sintered bodies of Test Examples 1 through 6 had good oxygen permeability calculated from the amount of CO and $CO_2$. This result leads to the conclusion that those ceramic members have excellent partial oxidation ability with respect to methane (partial oxidation ability with respect to hydrocarbons).

TEST EXAMPLE 10

Fabrication of Sintered Body (7)

$La_2O_3$, $SrCO_3$, $TiO_2$ and $Fe_2O_3$ as starting material powders were mixed so as to obtain stoichiometric ratios of x=0.4 and y=0.9 in the formula $(La_{1-x}Sr_x)(Ti_{1-y}Fe_y)O_3$ representing the composition of the sintered body obtained after firing. The mixture was prefired at a temperature of 1000° C. in air, and the obtained prefired material was ground and molded into a disk with a diameter of 22 mm and a thickness of 1.5 mm. A sintered body (ceramic) of Test Example 10 was fabricated by firing the molded body at a temperature of 1600° C. in air.

TEST EXAMPLE 11

Fabrication of Sintered Body (8)

$La_2O_3$, $BaCO_3$, $TiO_2$ and $Fe_2O_3$ as starting material powders were mixed so as to obtain stoichiometric ratios (almost the same composition as that of Test Example 6) of x=0.5 and y=0.9 in the formula $(La_{1-x}Ba_x)(Ti_{1-y}Fe_y)O_3$ representing the composition of the sintered body obtained after firing. With respect to other conditions, the sintered body of Test Example 11 was fabricated in the same manner as in Test Example 10.

TEST EXAMPLE 12

Fabrication of Sintered Body (9)

$La_2O_3$, $CaCO_3$, $TiO_2$ and $Fe_2O_3$ as starting material powders were mixed so as to obtain stoichiometric ratios of x=0.35 and y=0.9 in the formula $(La_{1-x}Ca_x)(T_{1-y}Fe_y)O_3$ representing the composition of the sintered body obtained after firing. With respect to other conditions, the sintered body of Test Example 12 was fabricated in the same manner as in Test Example 10.

TEST EXAMPLE 13

Fabrication of Comparative Sintered Body $La_2O_3$, $SrCO_3$, $Ga_2O_3$ and $Fe_2O_3$ as starting material powders were mixed so as to obtain stoichiometric ratios of x=0.3 and y=0.4 in the formula $(La_{1-x}Sr_x)(Ga_{1-y}Fe_y)O_3$ representing the composition of the sintered body obtained after firing. With respect to other conditions, the sintered body (comparative sintered body) of Test Example 13 was fabricated in the same manner as in Test Example 10.

TEST EXAMPLE 14

Evaluation of Hydrocarbon Partial Oxidation Ability (2)

Ceramic members for partial oxidation of hydrocarbons were fabricated by applying (La, Sr)CoO$_3$ as an oxygen ion permeation-enhancing catalyst to the surface, on the side of the oxygen source supply chamber, of each sintered body obtained in Test Examples 10 through 13, and applying an Ni-containing catalyst serving as an oxidation-enhancing catalyst to the surface on the side of the oxidation reaction chamber. The oxygen ion permeation modules 1 with the configuration shown in FIG. 1 were produced using these ceramic members. Air as an oxygen-containing gas (partial pressure of oxygen approximately 200 hPa (approximately 0.2 atm)) was supplied at a flow rate of 500 mL/min into the oxygen source supply chamber 20 of the oxygen ion permeation module 1. Further, a methane-nitrogen gas mixture (methane:nitrogen volume ratio was 55:45) as an oxidation reaction chamber gas was supplied at a flow rate of 15 mL/min into the oxidation reaction chamber. The oxygen supply flow rate was approximately 12 times that of hydrocarbon (here, methane). In this state, the temperature of the oxygen ion permeation module 1 (ceramic member 10) was adjusted to 900° C. and maintained for 30 min. Then, the composition of the oxidation reaction chamber gas discharged from the oxidation reaction chamber 30 was measured by gas chromatography, and the amount of oxygen (calculated as oxygen molecules; $\mu$mol/min-cm$^2$) that permeated through the ceramic member 10 at a temperature of 900° C. was evaluated from the amounts of chemical species (here, substantially CO, $CO_2$, and $O_2$) containing oxygen. The results are shown in Table 5.

TABLE 5

| | Ceramic composition | Composition of gas released from oxidation reaction chamber (vol. %) | | | | | Oxygen permeation rate ($\mu$mol/cm$^2$-min) |
|---|---|---|---|---|---|---|---|
| | | $H_2$ | CO | $CH_4$ | $CO_2$ | $O_2$ | |
| Working Example 10 | $La_{0.6}Sr_{0.4}Ti_{0.1}Fe_{0.9}O_3$ | 28 | 14 | 16 | 3 | 0.2 | 125 |
| Working Example 11 | $La_{0.5}Ba_{0.5}Ti_{0.1}Fe_{0.9}O_3$ | 29 | 13 | 14 | 1 | 0.3 | 98 |

TABLE 5-continued

|  | Ceramic composition | Composition of gas released from oxidation reaction chamber (vol. %) | | | | | Oxygen permeation rate ($\mu mol/cm^2$-min) |
|---|---|---|---|---|---|---|---|
|  |  | $H_2$ | CO | $CH_4$ | $CO_2$ | $O_2$ |  |
| Working Example 12 | $La_{0.65}Ca_{0.35}Ti_{0.1}Fe_{0.9}O_3$ | 38 | 10 | 12 | 1 | 0.2 | 73 |
| Working Example 13 | $La_{0.7}Sr_{0.3}Ga_{0.6}Fe_{0.4}O_3$ | 37 | 16 | 13 | 0.8 | 0.25 | 100 |

As shown in Table 5, all the ceramic members using the sintered bodies of Test Examples 10 through 12 had good oxygen permeability calculated from the amount of CO, $CO_2$ and $O_2$. This result leads to the conclusion that those ceramic members have excellent partial oxidation ability with respect to methane (partial oxidation ability with respect to hydrocarbons). This oxygen permeability is similar to that of the ceramic member using a sintered body (comparative sintered body) of Test Example 13, which was represented by the chemical formula $(La_{0.7}Sr_{0.3})(Ga_{0.8}Fe_{0.4})O_3$, or superior to the ceramic member of Test Example 13. Furthermore, $TiO_2$ used as the starting material powder for the sintered bodies of Test Examples 10 to 12 obviously could be acquired at a lower cost than $Ga_2O_3$ used as the starting material powder for the sintered body of Test Example 13. Moreover, visual observation of the surface of each ceramic member on the side of the oxidation reaction chamber after the evaluation tests demonstrated that the precipitation of carbon in the case of ceramic members of Test Examples 10 to 12 is less than that for the ceramic member of Test Example 4. No abnormal cracking was observed in any of the ceramic members after the evaluation tests.

TEST EXAMPLE 15

Fabrication of Sintered Body (10)

$La_2O_3$, $SrCO_3$, $TiO_2$ and $Fe_2O_3$ as starting material powders were mixed so as to obtain stoichiometric ratios of $x=0.3$ and $y=0.9$ in the formula $(La_{1-x}Sr_x)(Ti_{1-y}Fe_y)O_3$ representing the composition of the sintered body obtained after firing. The mixture was prefired at a temperature of 1000° C. in air, and the obtained prefired material was ground and molded into a test tube (closed-end tube with round bottom) with an outer diameter of 20 mm and a length of 150 mm. A sintered body (ceramic) of Test Example 15 was fabricated by firing the molded body at a temperature of 1600° C. in air. The membrane thickness (thickness of the wall) of the sintered body thus obtained was approximately 0.5 mm.

TEST EXAMPLE 16

Fabrication of Sintered Body (11)

$La_2O_3$, $SrCO_3$, $TiO_2$ and $Fe_2O_3$ as starting material powders were mixed so as to obtain stoichiometric ratios of $x=0.3$ and $y=0.7$ in the aforesaid chemical formula. With respect to other conditions, the sintered body of Test Example 16 was fabricated in the same manner as in Test Example 15. The membrane thickness of the sintered body thus obtained was 0.3 mm or less (approximately 0.28 mm).

TEST EXAMPLE 17

Fabrication of Sintered Body (12)

$La_2O_3$, $SrCO_3$, $TiO_2$ and $Fe_2O_3$ as starting material powders were mixed so as to obtain stoichiometric ratios of $x=0.5$ and $y=0.5$ in the aforesaid chemical formula. With respect to other conditions, the sintered body of Test Example 17 was fabricated in the same manner as in Test Example 15. The membrane thickness of the sintered body thus obtained was 0.3 mm or less (approximately 0.28 mm).

TEST EXAMPLE 18

Fabrication of Sintered Body (13)

$La_2O_3$, $SrCO_3$, $TiO_2$ and $Fe_2O_3$ as starting material powders were mixed so as to obtain stoichiometric ratios of $x=0.7$ and $y=0.5$ in the aforesaid chemical formula. With respect to other conditions, the sintered body of Test Example 18 was fabricated in the same manner as in Test Example 15. The membrane thickness of the sintered body thus obtained was approximately 0.3 mm.

TEST EXAMPLE 19

Fabrication of Sintered Body (14)

$La_2O_3$, $BaCO_3$, $TiO_2$ and $Fe_2O_3$ as starting material powders were mixed so as to obtain stoichiometric ratios of $x=0.4$ and $y=0.8$ in the formula $(La_{1-x}Ba_x)(Ti_{1-y}Fe_y)O_3$ representing the composition of the sintered body obtained after firing. With respect to other conditions, the sintered body of Test Example 19 was fabricated in the same manner as in Test Example 15. The membrane thickness of the sintered body thus obtained was approximately 0.6 mm.

TEST EXAMPLE 20

Fabrication of Sintered Body (15)

$La_2O_3$, $BaCO_3$, $TiO_2$ and $Fe_2O_3$ as starting material powders were mixed so as to obtain stoichiometric ratios of $x=0.4$ and $y=0.6$ in the aforesaid chemical formula. With respect to other conditions, the sintered body of Test Example 20 was fabricated in the same manner as in Test Example 19. The membrane thickness of the sintered body thus obtained was approximately 0.4 mm or less (approximately 0.36 mm).

TEST EXAMPLE 21

Fabrication of Sintered Body (16)

$La_2O_3$, $CaCO_3$, $TiO_2$ and $Fe_2O_3$ as starting material powders were mixed so as to obtain stoichiometric ratios of x=0.25 and y=0.75 in the formula $(La_{1-x}Ca_x)(Ti_{1-y}Fe_y)O_3$ representing the composition of the sintered body obtained after firing. With respect to other conditions, the sintered body of Test Example 21 was fabricated in the same manner as in Test Example 15. The membrane thickness of the sintered body thus obtained was approximately 0.5 mm or less (approximately 0.48 mm).

TEST EXAMPLE 22

Evaluation of Hydrocarbon Partial Oxidation Ability (3)

(La, Sr)CoO$_3$ as an oxygen ion permeation-enhancing catalyst was caused to adhere to the inner surface (surface on the side of the oxygen source supply chamber) of each sintered body obtained in Test Examples 15 through 21. Then, an Ni-containing catalyst serving as the oxidation-enhancing catalyst was caused to adhere to the outer surface (surface on the side of the oxidation reaction chamber) of those sintered bodies. Ceramic members for partial oxidation of hydrocarbons were thus fabricated. The oxygen ion permeation modules 1 with the configuration shown in FIG. 7 were fabricated using these ceramic members. Air as an oxygen-containing gas (partial pressure of oxygen approximately 200 hPa (approximately 0.2 atm)) was supplied at a flow rate of 1000 mL/min into the oxygen source supply chamber 20 of the oxygen ion permeation module 1. Further, a methane-nitrogen gas mixture (methane:nitrogen volume ratio was 2:1) as the oxidation reaction chamber gas was supplied at a flow rate of 5-60 mL/min (here 15 mL/min) into the oxidation reaction chamber 30. In this state, the temperature of the oxygen ion permeation module 1 (ceramic member 10) was adjusted to 900° C. and maintained for 30 min. Then, the composition of the oxidation reaction chamber gas discharged from the oxidation reaction chamber 30 was measured by gas chromatography, and the amount of oxygen (calculated as oxygen molecules; μmol/min-cm$^2$) that permeated through the ceramic member 10 at a temperature of 900° C. was evaluated from the amounts of chemical species (here, substantially CO, CO$_2$, and O$_2$) containing oxygen. The results are shown in Table 6.

TABLE 6

| | | Film thickness (mm) | Oxygen permeation rate (μmol/ cm$^2$- min) | Reduction expansion ratio (%) | Endurance |
|---|---|---|---|---|---|
| Working Example 15 | La$_{0.7}$Sr$_{0.3}$Ti$_{0.1}$Fe$_{0.9}$O$_3$ | 0.5 | 125 | 0.7 | ○ |
| Working Example 16 | La$_{0.7}$Sr$_{0.3}$Ti$_{0.3}$Fe$_{0.7}$O$_3$ | <0.3 | 35 | 0.1 | ⊗ |
| Working Example 17 | La$_{0.5}$Sr$_{0.5}$Ti$_{0.5}$Fe$_{0.5}$O$_3$ | <0.3 | 12 | <0.01 | ⊗ |
| Working Example 18 | La$_{0.3}$Sr$_{0.7}$Ti$_{0.5}$Fe$_{0.5}$O$_3$ | 0.3 | 29 | 0.3 | ○ |
| Working Example 19 | La$_{0.6}$Ba$_{0.4}$Ti$_{0.4}$Fe$_{0.8}$O$_3$ | 0.6 | 98 | 0.65 | ○ |
| Working Example 20 | La$_{0.6}$Ba$_{0.4}$Ti$_{0.2}$Fe$_{0.6}$O$_3$ | <0.4 | 23 | 0.1 | ⊗ |
| Working Example 21 | La$_{0.75}$Ca$_{0.25}$Ti$_{0.25}$Fe$_{0.75}$O$_3$ | <0.5 | 20 | 0.1 | ⊗ |

As shown in Table 6, all the ceramic members using the sintered bodies of Test Examples 15 through 21 had good oxygen permeability calculated from the amount of CO and CO$_2$. This result leads to the conclusion that these ceramic members have excellent partial oxidation ability with respect to methane (partial oxidation ability with respect to hydrocarbons).

TEST EXAMPLE 23

Evaluation of Thermal Expansion Coefficient

Sintered bodies were fabricated in the same manner as in Test Examples 15 through 21, except that the prefired material was molded into a cylindrical columnar shape. Samples with the cylindrical columnar shape having a diameter of 5 mm and a length of 20 mm were fabricated by cutting those sintered bodies. An elongation within a temperature range from room temperature to 800° C. was measured in the air atmosphere (partial pressure of oxygen is approximately 200 hPa (approximately 0.2 atm)), and a reducing atmosphere (contains hydrogen 5 vol. % and nitrogen 95 vol. %) by using the samples and this elongation was represented as a percentage of the length at room temperature. Thermal expansion coefficient E$_{air}$ in the air atmosphere, and thermal expansion coefficient E$_{red}$ in the reducing atmosphere, were thus found for each sintered body. The difference therebetween (E$_{red}$−E$_{air}$) is represented in Table 6 as a reduction expansion ratio (%) of each sintered body.

TEST EXAMPLE 24

Evaluation of Endurance

A hydrocarbon partial oxidation test was continuously conducted under the same conditions as in Test Example 22 and the composition of the oxidation reaction chamber gas that was discharged was measured by gas chromatography. As a result, the interval from the start of the test to the initiation of cracking in the sintered bodies (until air starts to leak) was investigated. The results are also presented in Table 6. The reference symbol "⊗" in the table relates to the cases in which the interval from the test start to the occurrence of leak was 10 h or more, and the reference symbol "○" relates to the cases in which the interval to the leak occurrence was 2 h or more (2 to 10 h). A sintered body having the composition ((La$_{0.7}$Sr$_{0.3}$)(Ga$_{0.6}$Fe$_{0.4}$)O$_3$) of Test Example 13 was fabricated by operations identical to those of Test Example 15, and the endurance of the sintered bodies was evaluated by conducting a hydrocarbon partial oxidation test in the same manner as that used for the sintered bodies in Test Examples 15 through 21. Leaks started within less than 1 h from the start of the test.

Specific examples of the present invention were described above. However, those examples are merely illustrative and place no limitation on the claims. The technology described in the patent claims includes modifications and changes of the above-described illustrative examples. Further, the technological features explained in the present specification or appended drawings demonstrate technological utility when used individually or in a variety of combinations and are not limited to the combinations described at the time of filing. Moreover, the technology illustrated in the present specification or appended drawings achieves a plurality of objects at the same time, and achieving even one object among them possesses by itself a technological utility.

The invention claimed is:

1. An oxygen separation method comprising:
using at least one ceramic member having a perovskite-type crystal structure represented by any one of the following (A)-(B):
(A) the general formula $$(Ln_{1-x}Sr_x)(Ti_{1-y}Fe_y)O_3$$

where the Ln represents at least one element selected from lanthanoids; the x satisfies the condition $0.2 \leq x \leq 0.6$, the y satisfies the condition $0.5 \leq y < 1$ and x and y satisfy the condition $1 \leq x+y \leq 1.2$; and
(B) the general formula $$(Ln_{1-x}Ba_x)(Ti_{1-y}Fe_y)O_3$$

where the Ln represents at least one element selected from lanthanoids, the x satisfies the condition $0.3 \leq x \leq 0.7$ the y satisfies the condition $0.5 \leq y < 1$, and x and y satisfy the condition $1 \leq x+y < 1.2$,
the ceramic member used being formed into a membrane with a thickness of 1mm or less;
supplying a gas containing oxygen to the ceramic member; and
inducing selective permeation of oxygen ions in the ceramic member.

2. The method of claim 1, wherein the ceramic member used is formed into a membrane with a thickness of 0.5mm or less.

3. A laminated oxygen ion conductive part comprising:
a porous support body; and
at least one membranous ceramic member with a thickness of 0.5mm or less which is provided on the surface of the porous support body, the ceramic member having a perovskite-type crystal structure represented by any one of the following (A)-(B):
(A) The general formula $$(Ln_{1-x}Sr_x)(Ti_{1-y}Fe_y)O_3$$

where the Ln represents at least one element selected from lanthanoids; the x satisfies the condition $0.2 \leq x \leq 0.6$ the y satisfies the condition $0.5 \leq y < 1$ and x and y satisfy the condition $1 \leq x+y < 1.2$; and
(B) the general formula $$(Ln_{1-x}Ba_x)(Ti_{1-y}Fe_y)O_3$$

where the Ln represents at least one element selected from lanthanoids, the x satisfies the condition $0.3 \leq x \leq 0.7$, the y satisfies the condition $0.5 \leq y < 1$, and x and y satisfy the condition $1 \leq x+y < 1.2$.

4. The laminated oxygen ion conductive part according to claim 3, wherein a catalyst for enhancing the permeation of oxygen ions is applied to the surface of the membranous ceramic material and/or the porous support body.

5. The laminated oxygen ion conductive part according to claim 4, wherein $(La_xSr_{1-x})M'O_3$ (where, $0.1 \leq x \leq 1$, and M' is at least one selected from Co, Cu, Fe, and Mn) is the catalyst for enhancing the permeation of oxygen ions.

6. An oxygen ion permeation module comprising:
a casing;
at least one membranous ceramic member with oxygen ion conductivity and a thickness of 0.5mm or less which is accommodated in the casing, the ceramic member having a perovskite-type crystal structure and a composition represented by any one of the following (A)-(B):
(A) the general formula $$(Ln_{1-x}Sr_x)(Ti_{1-y}Fe_y)O_3$$

where the Ln represents at least one element selected from lanthanoids; the x satisfies the condition $0.2 \leq x \leq 0.6$, the y satisfies the condition $0.5 \leq y < 1$, and x and y satisfy the condition $1 \leq x+y < 1.2$; and
(B) the general formula $$(Ln_{1-x}Ba_x)(Ti_{1-y}Fe_y)O_3$$

where the Ln represents at least one element selected from lanthanoids, the x satisfies the condition $0.3 \leq x \leq 0.7$, the y satisfies the condition $0.5y \leq y \leq 1$, and x and y satisfy the condition $1 \leq x+y \leq 1.2$;
an oxygen source supply chamber for supplying an oxygen-containing gas from the outside, the oxygen source supply chamber being provided inside the casing so as to face the ceramic member; and
an oxidation reaction chamber provided inside the casing so as to face the ceramic member, hermetically separated from the oxygen source supply chamber via the ceramic member and serving to induce an oxidation reaction with the participation of oxygen ions that are supplied by permeation through the ceramic member from the oxygen source supply chamber.

7. The oxygen ion permeation module according to claim 6, wherein a catalyst for enhancing the permeation of oxygen ions is applied to the surface of the membranous ceramic member on the side of the oxygen source supply chamber.

8. The oxygen ion permeation module according to claim 7, wherein $(La_xSr_{1-x})M'O_3$ (where, $0.1 \leq x < 1$, and M' is at least one selected from Co, Cu, Fe, and Mn) is the catalyst for enhancing the permeation of oxygen ions.

9. The oxygen ion permeation module according to claim 6, wherein a catalyst for enhancing the oxidation reaction is applied to the surface of the membranous ceramic member on the side of the oxidation reaction chamber.

10. The oxygen ion permeation module according to claim 9, wherein an Ni-based catalyst is the catalyst for enhancing the oxidation reaction.

11. An oxygen ion permeation module comprising:
a casing;
a laminated oxygen ion conductive part according to claim 3, which is accommodated in the casing;
an oxygen source supply chamber for supplying an oxygen-containing gas from the outside, this chamber being provided inside the casing so as to face the laminated. oxygen ion conductive part; and
an oxidation reaction chamber provided inside the casing so as to face the laminated oxygen ion conductive part, hermetically separated from the oxygen source supply chamber via this part and serving to induce an oxidation reaction with the participation of oxygen ions that are supplied by permeation through the ceramic member from the oxygen source supply chamber.

12. The oxygen ion permeation module according to claim 11, wherein a catalyst for enhancing the permeation of oxygen ions is applied to the surface of the ceramic member on the side of the oxygen source supply chamber and/or the porous support body located on the side of the oxygen source supply chamber from the ceramic member.

13. The oxygen ion permeation module according to claim 12, wherein $(La_xSr_{1-x})M'O_3$ (where $0.1 \leqq x \leqq 1$, and M' is at least one selected from Co, Cu, Fe, and Mn) is the catalyst for enhancing the permeation of oxygen ions.

14. The oxygen ion permeation module according to claim 11, wherein a catalyst for enhancing the oxidation reaction is applied to the surface of the ceramic member on the side of the oxidation reaction chamber and/or the porous support body located on the side of the oxidation reaction chamber from the ceramic member.

15. The oxygen ion penneation module according to claim 14, wherein an Ni-based catalyst is the catalyst for enhancing the oxidation reaction.

16. An oxygen separator comprising:
an oxygen ion permeation module according to claim 6;
an oxygen source supply means for causing a gas containing oxygen to flow through to the oxygen source supply chamber of the module and bringing the gas into contact with the surface of the ceramic member on the side of the oxygen source supply chamber; and
an oxidation reaction chamber gas circulation means for causing a gas with a partial pressure of oxygen lower than that on the oxygen source supply chamber side to flow through to the oxidation reaction chamber of the module and bringing the gas into contact with the surface of the ceramic member on the side of the oxidation reaction chamber.

17. An oxygen separator comprising:
an oxygen ion permeation module according to claim 11,
an oxygen source supply means for causing a gas containing oxygen to flow through to the oxygen source supply chamber of the module and bringing the gas into contact with the surface of the ceramic member on the side of the oxygen source supply chamber; and
an oxidation reaction chamber gas circulation means for causing a gas with a partial pressure of oxygen lower than that on the oxygen source supply chamber side to flow through to the oxidation reaction chamber of the module and bringing the gas into contact with the surface of the ceramic member on the side of the oxidation reaction chamber.

18. An oxidation reactor comprising:
an oxygen ion permeation module according to claim 6;
an oxygen source supply means for supplying a gas containing oxygen to the oxygen source supply chamber of the module and bringing the gas into contact with the surface of the ceramic member on the side of the oxygen source supply chamber; and
an oxidation target gas supply means for supplying a gas containing the oxidation target gas and having a partial pressure of oxygen lower than that on the oxygen source supply chamber side to the oxidation reaction chamber of the module and bringing the gas into contact with the surface of the ceramic member on the side of the oxidation reaction chamber.

19. The oxidation reactor according to claim 18,
wherein the oxidation reactor is a reactor for partial oxidation of hydrocarbons, and
wherein the oxidation target gas is a hydrocarbon, and the flow rate of oxygen supplied by the oxygen source supply means is by a factor of two or more higher than the flow rate of the hydrocarbon supplied by the oxidation target gas supply means.

20. An oxidation reactor comprising:
an oxygen ion permeation module according to claim 11;
an oxygen source supply means for supplying a gas containing oxygen to the oxygen source supply chamber of the module and bringing the gas into contact with the surface of the ceramic member on the side of the oxygen source supply chamber; and
an oxidation target gas supply means for supplying a gas containing the oxidation target gas and having a partial pressure of oxygen lower than that on the oxygen source supply chamber side to the oxidation reaction chamber of the module and bringing the gas into contact with the surface of the ceramic member on the side of the oxidation reaction chamber.

21. The oxidation reactor according to claim 20,
wherein the oxidation reactor is a reactor for partial oxidation of hydrocarbons, and
wherein the oxidation target gas is a hydrocarbon, and the flow rate of oxygen supplied by the oxygen source supply means is by a factor of two or more higher than the flow rate of the hydrocarbon supplied by the oxidation target gas supply means.

* * * * *